(12) United States Patent
Feng et al.

(10) Patent No.: US 10,919,984 B2
(45) Date of Patent: Feb. 16, 2021

(54) POLYMER-BASED RESIN COMPOSITIONS DERIVED FROM CELLULOSE AND ARTICLES MADE USING THESE COMPOSITIONS

(71) Applicant: Eastman Chemical Company, Kingsport, TN (US)

(72) Inventors: Wenlai Feng, Johnson City, TN (US); Haining An, Kingsport, TN (US); Michael Eugene Donelson, Kingsport, TN (US); Thomas Joseph Pecorini, Kingsport, TN (US); Robert Ellis McCrary, Kingsport, TN (US); Douglas Weldon Carico, Kingsport, TN (US); Spencer Allen Gilliam, Gate City, VA (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 16/348,550

(22) PCT Filed: Nov. 9, 2017

(86) PCT No.: PCT/US2017/060823
§ 371 (c)(1),
(2) Date: May 9, 2019

(87) PCT Pub. No.: WO2018/089610
PCT Pub. Date: May 17, 2018

(65) Prior Publication Data
US 2019/0359793 A1 Nov. 28, 2019

Related U.S. Application Data

(60) Provisional application No. 62/420,989, filed on Nov. 11, 2016, provisional application No. 62/505,261, (Continued)

(51) Int. Cl.
| | |
|---|---|
| *B32B 7/02* | (2019.01) |
| *C08B 3/16* | (2006.01) |
| *C08K 5/1515* | (2006.01) |
| *C08K 5/526* | (2006.01) |
| *C08L 1/10* | (2006.01) |
| *C08L 1/14* | (2006.01) |
| *C08L 1/12* | (2006.01) |
| *C08L 1/02* | (2006.01) |
| *B29C 45/00* | (2006.01) |
| *C08B 3/06* | (2006.01) |
| *C08K 5/00* | (2006.01) |

(Continued)

(52) U.S. Cl.
CPC ............ *C08B 3/16* (2013.01); *B29C 45/0001* (2013.01); *C08B 3/06* (2013.01); *C08K 5/1515* (2013.01); *C08K 5/526* (2013.01); *C08L 1/02* (2013.01); *C08L 1/10* (2013.01); *C08L 1/12* (2013.01); *C08L 1/14* (2013.01); *B29K 2001/12* (2013.01); *B29K 2105/0038* (2013.01); *B29K 2995/0017* (2013.01); *B29K 2995/0056* (2013.01); *C08K 5/0016* (2013.01); *C08L 2205/02* (2013.01); *C08L 2205/06* (2013.01)

(58) Field of Classification Search
CPC .. C08L 1/14; C08L 25/08; C08L 75/04; C08L 1/02; C08L 1/10; C08L 1/12; C08L 2205/02; C08L 2205/06; C08K 5/107; C08K 5/0016; C08K 5/1515; C08K 5/526; B29C 45/0001; B29K 2001/12; B29K 2105/0038; B29K 2995/0017; B29K 2995/0056; C08B 3/06; C08B 3/16
See application file for complete search history.

(56) References Cited

U.S. PATENT DOCUMENTS

| 1,683,347 A | 9/1928 | Gray et al. |
| 1,698,049 A | 1/1929 | Clarke et al. |

(Continued)

FOREIGN PATENT DOCUMENTS

| IT | 951 049 A1 | 11/1996 |
| WO | WO 2003/062314 A1 | 7/2003 |

(Continued)

OTHER PUBLICATIONS

ASTM D648; "Standard Test Method for Deflection Temperature of Plastics Under Flexural Load in the Edgewise Position"; Apr. 2018.
(Continued)

*Primary Examiner* — Lawrence D Ferguson
(74) *Attorney, Agent, or Firm* — Robert C. Morriss

(57) ABSTRACT

An injection molded article comprising a thin-walled body portion formed from a polymer-based resin derived from cellulose, wherein the thin-walled body portion comprises:
i. a gate position;
ii. a last fill position;
iii. a flow length to wall thickness ratio greater than or equal to 100, wherein the flow length is measured from the gate position to the last fill position; and
iv. a wall thickness less than or equal to about 2 mm; and
wherein the polymer-based resin has an HDT or at least 95° C., a bio-derived content of at least 20 wt %, and a spiral flow length of at least 3.0 cm, when the polymer-based resin is molded with a spiral flow mold with the conditions of a barrel temperature of 238° C., a melt temperature of 246° C., a molding pressure of 13.8 MPa, a mold thickness of 0.8 mm, and a mold width of 12.7 mm.

20 Claims, No Drawings

Related U.S. Application Data filed on May 12, 2017, provisional application No. 62/505,268, filed on May 12, 2017, provisional application No. 62/513,467, filed on Jun. 1, 2017.

(51) Int. Cl.
  *B29K 1/00* (2006.01)
  *B29K 105/00* (2006.01)

(56) References Cited

U.S. PATENT DOCUMENTS

| | | | |
|---|---|---|---|
| 1,880,560 A | 10/1932 | Webber et al. | |
| 1,880,808 A | 10/1932 | Clarke et al. | |
| 1,984,147 A | 12/1934 | Malm | |
| 2,129,052 A | 9/1938 | Fordyce | |
| 3,448,173 A | 6/1969 | Ryan et al. | |
| 3,617,201 A | 11/1971 | Bernie et al. | |
| 3,655,825 A | 4/1972 | Souder et al. | |
| 3,853,968 A | 12/1974 | Bortnick et al. | |
| 3,948,674 A | 4/1976 | Coaker et al. | |
| 4,147,603 A | 4/1979 | Pacifici et al. | |
| 4,263,183 A | 4/1981 | Light et al. | |
| 4,446,585 A | 5/1984 | Harding et al. | |
| 4,758,645 A | 7/1988 | Miyazono et al. | |
| 4,839,230 A | 6/1989 | Cook | |
| 4,861,629 A | 8/1989 | Nahm | |
| 5,082,914 A | 1/1992 | Cook et al. | |
| 5,182,379 A | 1/1993 | Cook et al. | |
| 5,292,877 A | 3/1994 | Edgar et al. | |
| 5,384,163 A | 1/1995 | Budde et al. | |
| 5,534,594 A | 7/1996 | Troy et al. | |
| 5,723,151 A | 3/1998 | Cook et al. | |
| 5,741,901 A | 4/1998 | Cook et al. | |
| 5,750,677 A | 5/1998 | Edgar et al. | |
| 5,871,573 A | 2/1999 | Cook et al. | |
| 5,981,738 A | 11/1999 | Cook et al. | |
| 6,331,580 B1 | 12/2001 | Molnar | |
| 6,369,214 B1 | 4/2002 | Tye et al. | |
| 2006/0058425 A1* | 3/2006 | Mohanty | C08B 3/22 523/209 |
| 2010/0144971 A1 | 6/2010 | Babcock et al. | |
| 2016/0068656 A1 | 3/2016 | Budhavaram et al. | |
| 2016/0090471 A1 | 3/2016 | Yao et al. | |

FOREIGN PATENT DOCUMENTS

| | | |
|---|---|---|
| WO | WO 2005/111184 A2 | 11/2005 |
| WO | WO 2011/062781 A1 | 5/2011 |

OTHER PUBLICATIONS

ASTM D256; "Standard Test Methods for Determining the Izod Pendulum Impact Resistance of Plastics"; Nov. 2018.
ASTM D638; "Standard Test Methods for Tensile Properties of Plastics"; Mar. 2015.
ASTM D790; "Standard Test Methods for Flexural Properties of Unreinforced and Reinforced Plastics and Electrical Insulating Materials"; Jul. 2017.
ASTM D3418; "Standard Test Method for Transition Temperatures and Enthalpies of Fusion and Crystallization of Polymers by Differential Scanning Calorimetry"; Jun. 2015.
ASTM D4440; "Standard Test Method for Plastics: Dynamic Mechanical Melt Rheology"; Feb. 2015.
ASTM D1003; "Standard Test Method for Haze and Luminous Transmittance of Transparent Plastics"; Nov. 2013.
ASTM E1348; "Standard Test Method for Transmittance and Color by Spectrophotometry Using Hemispherical Geometry"; Nov. 2015.
ASTM D6866; "Standard Test Methods for Determining the Biobased Content of Solid, Liquid, and Gaseous Samples Using Radiocarbon Analysis"; Mar. 2018.
ASTM D5296; "Standard Test Method for Molecular Weight Averages and Molecular Weight Distribution of Polystyrene by High Performance Size-Exclusion Chromatography".
ASTM D6474; "Standard Test Method for Determining Molecular Weight Distribution and Molecular Weight Average of Polyolefins by High Temperature Gel Permeation Chromatography" Dec. 2012.
ASTM D2990; "Standard Test Methods for Tensile, Compressive, and Flexural Creep and Creep-Rupture of Plastics"; Mar. 2017.
Shelton, Michael C.; "Cellulose Esters, Inorganic Esters"; Kirk-Othmer Encyclopedia of Chemical Technology, $5^{th}$ edition, vol. 5 (2004), pp. 394-412.
Gedon, Steven, et al.; "Cellulose Esters, Organic Esters"; Kirk-Othmer Encyclopedia of Chemical Technology, $5^{th}$ edition, vol. 5 (2004), pp. 412-444.
Notification of Transmittal of the International Search Report and the Written Opinion of the International Searching Authority, or the Declaration; International Application No. PCT/US2017/060803 dated Nov. 9, 2017.
Notification of Transmittal of the International Search Report and the Written Opinion of the International Searching Authority, or the Declaration; International Application No. PCT/US2017/060765 dated Nov. 9, 2017.
Notification of Transmittal of the International Search Report and the Written Opinion of the International Searching Authority, or the Declaration; International Application No. PCT/US2017/060823 dated Nov. 9, 2017.
The Dow Company: "Paraloid Acrylic Impact Modifier Platform for Profiles", 2008, XP002777924, URL:https://www.dow.com/assets/attachments/business/pbm/paraloid_km.shared_tds/paraloid.pdf.
Rohm and Haas: "Paraloid KM-355 Acrylic Impact Modifier", 2006, XP002777925, URL:https://www.dow.com/assets/attachments/business/pbm/paraloid_km/paraloid_km-355/tds/paraloid_km-355.pdf.
Co-pending U.S. Appl. No. 16/348,586, filed May 9, 2019; Feng et al.
Co-pending U.S. Appl. No. 16/348,573, filed May 9, 2019; Feng et al.

* cited by examiner

POLYMER-BASED RESIN COMPOSITIONS DERIVED FROM CELLULOSE AND ARTICLES MADE USING THESE COMPOSITIONS

CROSS-REFERENCE TO RELATED APPLICATION(S)

This application is a national stage filing under 35 USC § 371 of International Application Number PCT/US2017/060823, filed on Nov. 9, 2017, which claims the benefit of the filing date to U.S. Provisional Application Nos. 62/420,989 filed on Nov. 11, 2016, 62/505,261 filed on May 12, 2017, 62/505,268 filed on May 12, 2017 and 62/513,467 filed on Jun. 1, 2017 the entire disclosures of which are incorporated by reference herein.

FIELD OF THE INVENTION

This invention belongs to the field of polymer-based resins derived from cellulose, and particularly to cellulose esters useful for relatively high temperature applications. Plastic articles made using these compositions, such as eyeglass frames, automotive parts, housings, and toys are also provided.

BACKGROUND OF THE INVENTION

There has been increasing interest in materials produced from bio-sources such as wood, cotton or corn. Wood is a preferred source over corn as it does not potentially compete with the bio-based resin's use as a food source. In addition, common materials produced from corn, e.g., polylactic acid (PLA), have limitations on physical properties that restrict the range of applications for which they can be used.

It would be beneficial to have a bio-based material that has physical properties that can compete with engineering plastics, such as polycarbonate, nylon or ABS, in a range of applications. Cellulose acetate compositions have been used for molded articles, but typically have a heat deflection temperature (HDT) of less than 90° C. Commercially available cellulose esters that are utilized in melt processing and forming of articles typically contain significant amounts of plasticizer to allow for processing and to impart toughness to the molded article. However, the addition of plasticizer has drawbacks, as it will decrease the HDT relative to the base cellulose ester and limit the use of the cellulose ester materials for applications that can accommodate an HDT below about 90° C. Also, cellulose ester molded articles can experience plasticizer exudation during use.

It would be beneficial to be able to provide polymer-based resins derived from cellulose that can be melt processed and articles made from such compositions that do not have such drawbacks.

SUMMARY OF THE INVENTION

Surprisingly, it had been discovered that compositions of cellulose esters can be prepared having significant bio-based content and HDTs exceeding 90° C., or 95° C. In embodiments of the invention, this can be achieved by reducing the amount of plasticizer, and in certain embodiments eliminating the use of plasticizer, in the compositions, while maintaining a good balance of physical properties and the ability to process the compositions in conventional molding operations. The elimination of the plasticizer can eliminate the problems associated with plasticizer exudation during use.

It has been discovered that shaped articles can be prepared from bio-based plastic materials that have properties similar with or better than molded articles produced from oil-based engineering thermoplastics. More specifically, these shaped articles are produced from bio-based plastic material with a heat distortion temperature (HDT) greater than 90° C., or greater than 95° C. This elevated HDT vastly improves the ability of these articles to experience high temperature environments (i.e. dishwashing, holding hot liquids, sun exposure, etc.), resist creep and warpage during hot warehouse storage or during use in applications under moderate load or stress, and prevent loss in dimensional stability during use.

These bio-based plastic materials can process better into molded articles than other engineering thermoplastics, and the shaped articles can have higher stiffness than articles made from other materials, have superior toughness to articles produced from other bio-plastics, and have superior stress crack resistance to articles produced from other engineering thermoplastics.

In one aspect of the invention, it is directed to a shaped article comprising a polymer-based resin derived from cellulose, wherein the polymer-based resin has an HDT or at least 90° C., or at least 95° C., a bio-derived content of at least 20 wt %, and has at least one of the following properties chosen from: flexural modulus of greater than 1900 MPa as measured according to ASTM D790 using a 3.2 mm thick bar hat has been subjected to 50% relative humidity for 48 hours at 23° C.; a notched izod impact strength of greater than 80 J/m as measured according to ASTM D256 using a 3.2 mm thick bar that has been subjected to 50% relative humidity for 48 hours at 23° C.; a spiral flow length or at least 3.0 cm, when the polymer-based resin is molded with a spiral flow mold with the conditions of a barrel temperature of 238° C., a melt temperature of 246° C., a molding pressure of 13.8 MPa, a mold thickness of 0.8 mm, and a mold width of 12.7 mm; a flex creep deflection of less than 12 mm, measured using a molded bar having dimensions of 5" length, 0.5" width, and 0.125" thickness positioned horizontally on a fixture with a 4" span, inside a dry oven for 68 hours at 90° C. with a nominal 500 psi stress on the center of the span; a transmission of at least 70% measured according to ASTM D1003 using a 3.2 mm plaque after injection molding at a barrel set point of 249° C. and a residence time of 5 min; a ΔE value of less than 25, using a 3.2 mm plaque after injection molding with a barrel temperature of 249° C. and a residence time of 5 min; or an L* color of at least 85, measured according to ASTM E1348 using a 3.2 mm plaque after injection molding with a barrel temperature of 249° C. and a residence time of 5 min. In embodiments, the polymer-based resin has at least 2, or at least 3 of the listed properties. In certain embodiments, the polymer-based resin contains plasticizer in an amount from 1 to 15 wt %, or from 1 to 10 wt %, or from 1 to 9 wt %, or none. In certain embodiments, the polymer-based resin contains less than 5 wt %, or less than 4 wt %, or less than 3 wt %, or less than 2 wt %, or less than 1 wt %, or has no added plasticizer.

In embodiments of the invention, the shaped articles can be chosen from injection molded articles, extrusion molded articles, rotational molded articles, compression molded articles, blow molded articles, injection blow molded articles, injection stretch blow molded articles, extrusion blow molded articles, sheet or film extrusion articles, profile extrusion articles, gas assist molding articles, structural foam molded articles, or thermoformed articles.

In embodiments of the invention, the shaped article is chosen from opaque articles, transparent articles, see-through articles, thin-walled articles, technical articles (e.g., articles having a complex design), articles having high design specifications, intricate design articles, articles made from molds that are difficult to fill under typical molding operations or conditions, wearable articles, body contact articles, containers (including containers for materials intended for body contact), food contact articles, household articles, general consumer products, packaging articles, medical articles, or components thereof.

In embodiments, the transparent or see-through articles can be chosen from electronic displays, electronic display lenses or windows, electronic display covers, ophthalmic devices, ophthalmic lenses, ophthalmic frames, sunglasses, sunglass lenses, automotive interior parts, lighting devices, LED lights, lighting covers, headlight covers or enclosures, appliance parts, sporting goods, vehicle parts, instrumentation parts, instrumentation covers, timekeeping device parts, personal devices, personal electronic devices, medical devices, personal protection devices, safety devices, tools, guards, office supply devices, kitchen devices, kitchen articles, cutlery, glassware, barware, artist supply devices, decorative items, packaging, or components thereof.

In embodiments, the thin-walled articles can be chosen from food packaging articles (e.g., food containers and lids), automotive or other transportation articles (e.g. both structural and non-structural car parts), mobile telecommunications or handheld electronic articles (e.g. mobile phone housings), medical articles (e.g. syringes and connectors), computing equipment articles (e.g. computer housings), electronic devices, electronic parts, business machine housings, electronic housings, optical or electrical connectors, electronic covers, screens of electronic devices, touch screens, covers for screens or touch screens, or components thereof.

In embodiments, the technical articles, articles having high design specifications, intricate design articles, and difficult to mold articles can be chosen from transportation or automotive parts, electrical/electronic equipment parts, perfume or cosmetic containers, ophthalmic articles, lighting devices, timekeeping devices, medical devices, or components thereof.

In embodiments, the wearable articles or body contact articles can be chosen from eyeglass frames, eyeglass lenses, sunglass frames, sunglass lenses, goggles, wearable electronics, headphones, ear buds, watches, personal devices, personal electronics devices, medical devices, personal protection devices, safety devices, jewelry, water sport articles, or components thereof.

In embodiments, the household articles or general consumer articles can be chosen from kitchenware, barware, outdoor furniture, indoor furniture, furniture components, shelves, shelving dividers, slat walls, toys, luggage, appliances, small appliances, storage containers, office supply items, bathroom devices or fixtures, tools, home electronics, or components thereof.

In embodiments, the packaging articles can be chosen from packaging systems, product packaging, rigid medical packaging, containers, thin-walled cups, beakers, buckets, pails, folding boxes, crates, or components thereof.

In embodiments, the medical articles or devices can be chosen from disposable items, syringes, tubing, instruments, instrumentation, handles, medical packaging, medical containers, housings, or components thereof.

In another aspect, the invention is directed to an injection molded article comprising a thin-walled body portion formed from a polymer-based resin derived from cellulose, wherein the thin-walled body portion comprises:
 i. a gate position;
 ii. a last fill position;
 iii. a flow length to wall thickness ratio greater than or equal to 100, wherein the flow length is measured from the gate position to the last fill position; and
 iv. a wall thickness less than or equal to about 2 mm; and
 wherein the polymer-based resin has an HDT or at least 90° C., or at least 95° C., a bio-derived content of at least 20 wt %, or at least 40 wt %, and a spiral flow length of at least 3.0 cm, when the polymer-based resin is molded with a spiral flow mold with the conditions of a barrel temperature of 238° C., a melt temperature of 246° C., a molding pressure of 13.8 MPa, a mold thickness of 0.8 mm, and a mold width of 12.7 mm. In embodiments, the polymer-based resin has a spiral flow length of at least 4.0, or at least 5.0 cm.

In one embodiment of the injection molded article, the polymer-based resin further comprises at least one property chosen from: flexural modulus of greater than 1900 MPa as measured according to ASTM D790 using a 3.2 mm thick bar hat has been subjected to 50% relative humidity for 48 hours at 23° C.; a notched izod impact strength of greater than 80 J/m as measured according to ASTM D256 using a 3.2 mm thick bar hat has been subjected to 50% relative humidity for 48 hours at 23° C.; a flex creep deflection of less than 12 mm, measured using a molded bar having dimensions of 5" length, 0.5" width, and 0.125" thickness positioned horizontally on a fixture with a 4" span, inside a dry oven for 68 hours at 90° C. with a nominal 500 psi stress on the center of the span; a transmission of at least 70 measured according to ASTM D1003 using a 3.2 mm plaque after injection molding at a barrel set point of 249° C. and a residence time of 5 min; a LE value of less than 25, using a 3.2 mm plaque after injection molding with a barrel temperature of 249° C. and a residence time of 5 min; or an L* color of at least 85, measured according to ASTM E1348 using a 3.2 mm plaque after injection molding with a barrel temperature of 249° C. and a residence time of 5 min. In embodiments, the polymer-based resin comprises at least 2, or at least 3 of the listed properties. In embodiments, the polymer-based resin contains less than 5 wt %, or less than 4 wt %, or less than 3 wt %, or less than 2 wt %, or less than 1 wt %, or has no added plasticizer.

In embodiments, the gate position comprises a gate having a gate size, wherein the ratio of gate size to wall thickness is 1:1 or less, or 0.5:1 or less. In embodiments, the gate size is 1.0 mm or less, or 0.5 mm or less. In embodiments, the wall thickness is 1.5 mm or less, or 1.0 mm or less, or 0.5 mm or less.

In another aspect of the invention, it is directed to a housing comprising a polymer-based resin derived from cellulose, wherein the polymer-based resin has an HDT or at least 90° C., or at least 95° C., a bio-derived content of at least 20 wt %, and has at least one of the following properties chosen from: flexural modulus of greater than 1900 MPa as measured according to ASTM D790 using a 3.2 mm thick bar hat has been subjected to 50% relative humidity for 48 hours at 23° C.; a notched izod impact strength of greater than 80 J/m as measured according to ASTM D256 using a 3.2 mm thick bar hat has been subjected to 50% relative humidity for 48 hours at 23° C.; a spiral flow length or at least 3.0 cm, when the polymer-based resin is molded with a spiral flow mold with the conditions of a barrel temperature of 238° C., a melt temperature of 246° C., a molding pressure of 13.8 MPa, a mold thickness of 0.8 mm, and a mold width of 12.7 mm; a flex creep deflection of less than 12 mm, measured using a molded bar having dimensions of 5" length, 0.5" width, and 0.125" thickness positioned horizontally on a fixture with a 4" span, inside a dry oven for 68 hours at 90° C. with a nominal 500 psi stress on the center of the span; a transmission of at least 70 measured according to ASTM D1003 using a 3.2 mm plaque after injection molding at a barrel set point of 249° C. and a residence time of 5 min; a ΔE value of less than 25, using a 3.2 mm plaque after injection molding with a barrel temperature of 249° C. and a residence time of 5 min; or an L* color of at least 85, measured according to ASTM E1348 using a 3.2 mm plaque after injection molding with a barrel temperature of 249° C. and a residence time of 5 min. In embodiments, the polymer-based resin at least 2, or at least 3 of the listed properties. In embodiments, the polymer-based resin contains less than 5 wt %, or less than 4 wt %, or less than 3 wt %, or less than 2 wt %, or less than 1 wt %, or has no added plasticizer. In one embodiment, the housing is an electronic housing.

In embodiments in accordance with the various aspects of the invention disclosed herein, the polymer-based resin comprises a cellulose ester. In certain embodiments, the cellulose ester is chosen from CA (cellulose acetate), CAP (cellulose acetate propionate), CAB (cellulose acetate butyrate) or CAIB (cellulose acetate isobutyrate), ranging in total degree of substitution from 1.0 to 3.0. In one embodiment, the cellulose ester is CAP. In embodiments of the invention, the CAP contains 0-5 wt %, 0-2 wt %, 0 to less than 2 wt %, 0-1 wt %, or no added plasticizer.

In embodiments of the invention, the polymer-based resin comprises a cellulose ester; and optionally a plasticizer, wherein when the plasticizer is present, the plasticizer is present at less than 20 wt % based on the total weight of the composition, wherein the polymer-based resin has a heat distortion temperature ("HDT") that is greater than 90° C., or greater than 95° C., according to ASTM D638 as measured at 1.82 MPa using a 1.3 cm×12.7 cm×0.32 cm bar subjected to 50% relative humidity for 4 hours at 70° C., and wherein when the composition is injection molded with a barrel temperature of 260° C. with a residence time of 5 min, the change in the weight average molecular weight ("$M_w$") is less than 30%.

In certain embodiments, the polymer-based resin comprises a cellulose ester and a dispersion of one or more impact modifiers in the cellulose ester, in the form of small discrete particles in amounts sufficient to improve the mechanical and physical properties of the polymer-based resin, and where the impact modified cellulose ester resin can be melt processed.

In one embodiment of the invention, a polymer-based resin is provided comprising at least one cellulose ester, at least one impact modifier, and optionally, at least one plasticizer. In one embodiment, the cellulose ester is CAP and contains 0-1 wt % plasticizer. In one embodiment, the cellulose ester is CAP and contains no plasticizer.

In another embodiment of the invention, a cellulose ester composition is provided comprising at least one cellulose ester, and at least one impact modifier and at least one plasticizer. In one embodiment, the cellulose ester is CA and contains 1-15 wt % plasticizer. In embodiments, the cellulose ester is CA and contains 1-10 wt %, or 1—less than 10 wt %, or 1-9 wt % plasticizer.

DETAILED DESCRIPTION

In one aspect of the invention, it is directed to a shaped article comprising a polymer-based resin derived from cellulose, wherein the polymer-based resin has an HDT or at least 90° C., or at least 95° C., a bio-derived content of at least 20 wt %, and has at least one of the following properties chosen from: flexural modulus of greater than 1900 MPa as measured according to ASTM D790 using a 3.2 mm thick bar hat has been subjected to 50% relative humidity for 48 hours at 23° C.; a notched izod impact strength of greater than 80 J/m as measured according to ASTM D256 using a 3.2 mm thick bar hat has been subjected to 50% relative humidity for 48 hours at 23° C.; a spiral flow length or at least 3.0 cm, when the polymer-based resin is molded with a spiral flow mold with the conditions of a barrel temperature of 238° C., a melt temperature of 246° C., a molding pressure of 13.8 MPa, a mold thickness of 0.8 mm, and a mold width of 12.7 mm; a flex creep deflection of less than 12 mm, measured using a molded bar having dimensions of 5" length, 0.5" width, and 0.125" thickness positioned horizontally on a fixture with a 4" span, inside a dry oven for 68 hours at 90° C. with a nominal 500 psi stress on the center of the span; a transmission of at least 70 measured according to ASTM D1003 using a 3.2 mm plaque after injection molding at a barrel set point of 249° C. and a residence time of 5 min; a ΔE value of less than 25, using a 3.2 mm plaque after injection molding with a barrel temperature of 249° C. and a residence time of 5 min; or an L* color of at least 85, measured according to ASTM E1348 using a 3.2 mm plaque after injection molding with a barrel temperature of 249° C. and a residence time of 5 min. In embodiments, the polymer-based resin has at least 2, or at least 3 of the listed properties. In embodiments, the polymer-based resin contains less than 5 wt %, or less than 4 wt %, or less than 3 wt %, or less than 2 wt %, or less than 1 wt %, or has no added plasticizer.

In certain embodiments, it is directed to a shaped article comprising a polymer-based resin derived from cellulose, wherein the polymer-based resin has an HDT or at least 90° C., or at least 95° C., a bio-derived content of at least 20 wt %, a notched Izod impact strength of greater than 80 J/m as measured according to ASTM D256 using a 3.2 mm thick bar hat has been subjected to 50% relative humidity for 48 hours at 23° C., and has at least one of the following properties chosen from: flexural modulus of greater than 1900 MPa as measured according to ASTM D790 using a 3.2 mm thick bar hat has been subjected to 50% relative humidity for 48 hours at 23° C.; a spiral flow length or at least 3.0 cm, when the polymer-based resin is molded with a spiral flow mold with the conditions of a barrel temperature of 238° C., a melt temperature of 246° C., a molding pressure of 13.8 MPa, a mold thickness of 0.8 mm, and a mold width of 12.7 mm; a flex creep deflection of less than 12 mm, measured using a molded bar having dimensions of 5" length, 0.5" width, and 0.125" thickness positioned horizontally on a fixture with a 4" span, inside a dry oven for 68 hours at 90° C. with a nominal 500 psi stress on the center of the span; a transmission of at least 70 measured according to ASTM D1003 using a 3.2 mm plaque after injection molding at a barrel set point of 249° C. and a residence time of 5 min; a ΔE value of less than 25, using a 3.2 mm plaque after injection molding with a barrel temperature of 249° C. and a residence time of 5 min; or an L* color of at least 85, measured according to ASTM E1348 using a 3.2 mm plaque after injection molding with a barrel temperature of 249° C. and a residence time of 5 min. In embodiments, the polymer-based resin has at least 2, or at least 3 of the listed properties. In embodiments, the polymer-based resin contains less than 5 wt %, or less than 4 wt %, or less than 3 wt %, or less than 2 wt %, or less than 1 wt %, or has no added plasticizer.

In embodiments of the invention, the polymer-based resin has a heat distortion temperature ("HDT") greater than 90° C., or greater than 95° C., according to ASTM D648 as measured at 1.82 MPa using a 3.2 mm thick bar that was subjected to 70° C. for 4 hours. In certain embodiments, the polymer-based resin has a heat distortion temperature ("HDT") of at least 95° C., at least 100° C., at least 105° C., or at least 110° C., or at least 115° C. In certain embodiments, the polymer-based resin has a heat distortion temperature ("HDT") in the range from 90° C. to 140° C., 90° C. to 130° C., 90° C. to 120° C., 90° C. to 110° C., 95° C. to 140° C., 95° C. to 130° C., 95° C. to 120° C., 95° C. to 110° C., 95° C. to 105° C., 100° C. to 140° C., 100° C. to 130° C., 100° C. to 120° C., 100° C. to 110° C., 105° C. to 140° C., 105° C. to 130° C., 105° C. to 120° C., 105° C. to 115° C., 105° C. to 110° C., 110° C. to 140° C., 110° C. to 130° C., 110° C. to 125° C., 110° C. to 120° C., 110° C. to 115° C., 115° C. to 140° C., 115° C. to 130° C., 120° C. to 140° C., 120° C. to 130° C., or 120° C. to 125° C.

Bio-sourced products are typically identified through programs such as the USDA's Bio-Preferred program. These programs use ASTM method D6866-16 to measure the percentage of "new carbon" in the plastic material to produce the product. "New carbon" is the carbon that comes from recently grown plants. That is compared with "old carbon" that comes from oil, natural gas or coal. The "new carbon" content in the cellulose based plastics used in the present invention is typically in the range of 40% to 60%, which reflects the fact that the cellulose backbone in the cellulosic material comes from trees or cotton.

In embodiments of the invention, the polymer-based resin has a bio-derived content of at least 20 wt %, measured according to ASTM method D6866-16. In certain embodiments, the polymer-based resin has a bio-derived content of at least 25 wt %, or at least 30 wt %, or at least 35 wt %, or at least 40 wt %, or at least 45 wt %%, measured according to ASTM method D6866-16. In certain embodiments, the polymer-based resin has a bio-derived content in the range of about 20 to about 60 wt %, 20 to 50 wt %, 20 to 45 wt %, 25 to 60 wt %, 25 to 50 wt %, 25 to 45 wt %, 30 to 60 wt %, 30 to 50 wt %, 30 to 45 wt %, 35 to 60 wt %, 35 to 50 wt %, 35 to 45 wt %, 40 to 60 wt %, 40 to 50 wt %, or 40 to 45 wt %%, measured according to ASTM method D6866-16.

In embodiments of the invention, the polymer-based resin has a flexural modulus of greater than 1800 MPa as measured according to ASTM D790 using a 3.2 mm thick bar hat has been subjected to 50% relative humidity for 48 hours at 23° C. In certain embodiments, the polymer-based resin has a flexural modulus of at least 1900 MPa, at least 2000 MPa, at least 2100 MPa, at least 2200 MPa, at least 2300 MPa, or at least 2400 MPa, as measured according to ASTM D790 using a 3.2 mm thick bar hat has been subjected to 50% relative humidity for 48 hours at 23° C. In certain embodiments, the polymer-based resin has a flexural modulus is in the range of from about 1800 to about 3500 MPa, from about 1900 to about 3500 MPa, from about 2000 to about 3500 MPa, from about 2100 to about 3500 MPa, from about 2200 to about 3500 MPa, from about 2300 to about 3500 MPa, from about 2400 to about 3500 MPa, or from about 2500 to about 3500 MPa, as measured according to ASTM D790 using a 3.2 mm thick bar hat has been subjected to 50% relative humidity for 48 hours at 23° C. In certain embodiments, the polymer-based resin has a flexural modulus is in the range of from about 1900 to about 2500 MPa, from about 1900 to about 2800 MPa, or from about 1900 to about 3000 MPa, as measured according to ASTM D790 using a 3.2 mm thick bar hat has been subjected to 50% relative humidity for 48 hours at 23° C.

In embodiments of the invention, the polymer-based resin has a notched izod impact strength of at least 40 J/m, or at least 60 J/m, as measured according to ASTM D256 using a 3.2 mm thick bar hat has been subjected to 50% relative humidity for 48 hours at 23° C. In certain embodiments, the polymer-based resin has a notched izod impact strength of at least 80 J/m, at least 90 J/m, or at least 100 J/m, or at least 110 J/m, or at least 120 J/m, or at least 130 J/m, or at least 140 J/m, or at least 150 J/m, as measured according to ASTM D256 using a 3.2 mm thick bar that has been subjected to 50% relative humidity for 48 hours at 23° C. In certain embodiments, the polymer-based resin has a notched izod impact strength in the range of from about 40 J/m to about 400 J/m, from about 40 J/m to about 200 J/m, from about 60 J/m to about 400 J/m, from about 60 J/m to about 200 J/m, from about 80 J/m to about 500 J/m, from about 80 J/m to about 400 J/m, from about 80 J/m to about 300 J/m, from about 80 J/m to about 200 J/m, from 100 J/m to about 500 J/m, from about 100 J/m to about 400 J/m, from about 100 J/m to about 300 J/m, or from about 100 J/m to about 200 J/m, as measured according to ASTM D256 using a 3.2 mm thick bar that has been subjected to 50% relative humidity for 48 hours at 23° C.

In embodiments of the invention, the polymer-based resin has a spiral flow length of at least 3.0 cm, when the polymer-based resin is molded with a spiral flow mold with the conditions of a barrel temperature of 238° C., a melt temperature of 246° C., a molding pressure of 13.8 MPa, a mold thickness of 0.8 mm, and a mold width of 12.7 mm. In certain embodiments, the polymer-based resin has a spiral flow length of at least 4 cm, or at least 5 cm, when the polymer-based resin is molded with a spiral flow mold with the conditions of a barrel temperature of 238° C., a melt temperature of 246° C., a molding pressure of 13.8 MPa, a mold thickness of 0.8 mm, and a mold width of 12.7 mm. In certain embodiments, the polymer-based resin has a spiral flow length mold in the range from about 3.0 cm to about 10.0 cm, from about 4.0 cm to about 10.0 cm, from about 5.0 cm to about 10.0 cm, from about 4.0 cm to about 9.0 cm, from about 4.0 cm to about 8.0 cm, from about 4.0 cm to about 7.0 cm, or from about 5.0 cm to about 7.0 cm, when the polymer-based resin is molded with a spiral flow mold with the conditions of a barrel temperature of 238° C., a melt temperature of 246° C., a molding pressure of 13.8 MPa, a mold thickness of 0.8 mm, and a mold width of 12.7 mm.

In embodiments of the invention, the polymer-based resin has a flex creep deflection of less than 12 mm, or less than 11 mm, or less than 10 mm, after exposure for 68 hours inside an oven at 90° C. and tested in accordance with ASTM D2990 using an injection molded bar having dimensions of 5" length, 0.5" width, and 0.125" thickness positioned horizontally on a fixture with a 4" span, with a nominal 500 psi stress on the center of the span. In certain embodiments, the polymer-based resin has a flex creep deflection in the range from 2 to 12 mm, or 2 to 11 mm, or 2 to 10 mm, or 5 to 10 mm, after exposure for 68 hours inside an oven at 90° C. measured using an injection molded bar having dimensions of 5" length, 0.5" width, and 0.125" thickness positioned horizontally on a fixture with a 4" span, with a nominal 500 psi stress on the center of the span.

In embodiments of the invention, the polymer-based resin has a transmission of at least 70, or at least 75, or at least 80, or at least 85, or at least 90, measured according to ASTM D1003 using a 3.2 mm plaque after injection molding at a barrel set point of 249° C. and a residence time of 5 min. In certain embodiments, the polymer-based resin has transmission in the range from 70 to 95, or 75 to 95, or 80 to 95, or 85 to 95, or 70 to 90, or 75 to 90, or 80 to 90, or 85 to 90, measured according to ASTM D1003 using a 3.2 mm plaque after injection molding at a barrel set point of 249° C. and a residence time of 5 min.

In embodiments of the invention, the polymer-based resin has a ΔE value of less than 25, or less than 20, or less than 15, or less than 14, or less than 13, or less than 12, or less than 11, or less than 10, or less than 9, or less than 8, or less than 7, or less than 6, or less than 5, using a 3.2 mm plaque after injection molding with a barrel temperature of 249° C. and a residence time of 5 min, wherein ΔE is determined by the following equation: $((L^*-100)^2+(a^*-0)^2+(b^*-0)^2)^{1/2}$, where the L*, a*, and b* color components were measured according to ASTM E1348. In certain embodiments, the polymer-based resin has a ΔE value in the range from 2 to 25, or from 2 to 20, or from 2 to 15, or from 2 to 14, or from 2 to 13, or from 2 to 12, or from 2 to 11, or from 2 to 10, or from 2 to 9, or from 2 to 8, or from 2 to 7, or from 2 to 6, or from 2 to 5, using a 3.2 mm plaque after injection molding with a barrel temperature of 249° C. and a residence time of 5 min, wherein ΔE is determined by the following equation: $((L^*-100)^2+(a^*-0)^2+(b^*-0)^2)^{1/2}$, where the L*, a*, and b* color components were measured according to ASTM E1348.

In embodiments of the invention, the polymer-based resin has an L* color of at least 85, or at least 86, or at least 87, or at least 88, or at least 89, or at least 90, or at least 91, or at least 92, or at least 93, or at least 94, or at least 95, measured according to ASTM E1348 using a 3.2 mm plaque after injection molding with a barrel temperature of 249° C. and a residence time of 5 min. In certain embodiments, the polymer-based resin has an L* color in the range from 85 to 98, or from 85 to 97, or from 85 to 96, or from 85 to 95, measured according to ASTM E1348 using a 3.2 mm plaque after injection molding with a barrel temperature of 249° C. and a residence time of 5 min.

In embodiments of the invention, the polymer-based resin has a b* value is less than 15, or less than 12, or less than 10, or less than 9, or less than 8, or less than 7, or less than 6, or less than 5, or less than 4, measured according to ASTM E1348 using a 3.2 mm plaque after injection molding with a barrel temperature of 249° C. and a residence time of 5 min. In certain embodiments, the polymer-based resin has a b* color in the range from 0 to 15, or from 0 to 10, or from 0 to 8, or from 0 to 5, measured according to ASTM E1348 using a 3.2 mm plaque after injection molding with a barrel temperature of 249° C. and a residence time of 5 min.

In embodiments of the invention, the polymer-based resin has a change in the absolute weight average molecular weight ("$M_w$") due to injection molding of less than 30%, or less than 25%, or less than 20%, or less than 15%, or less than 10%, when the composition is injection molded with a barrel temperature of 260° C. with a residence time of 5 min. In certain embodiments, the polymer-based resin has a change in the absolute weight average molecular weight ("$M_w$") due to injection molding in the range of 0 to 30%, or 0 to 25%, or 0 to 20%, or 0 to 15%, or 0 to 10%, or 2 to 30%, or 2 to 25%, or 2 to 20%, or 2 to 15%, or 2 to 10%, when the composition is injection molded with a barrel temperature of 260° C. with a residence time of 5 min.

In embodiments of the invention, the polymer-based resin comprises a cellulose ester which has an absolute weight average molecular weight in the range of from about 40,000 Da to about 200,000 Da measured according to ASTM D5296 using tetrahydrofuran as a solvent and a flow rate of 1 mL/min. In certain embodiments, the cellulose ester has an absolute weight average molecular weight in the range of from about 50,000 Da to about 200,000 Da, or 50,000 Da to about 170,000 Da, or 50,000 Da to about 120,000 Da, or 50,000 Da to about 90,000 Da, or 60,000 Da to about 200,000 Da, or 60,000 Da to about 170,000 Da, or 60,000 Da to about 120,000 Da, or 60,000 Da to about 90,000 Da, or 90,000 Da to about 170,000 Da, or 90,000 Da to about 120,000 Da, or 120,000 Da to about 170,000 Da, or 120,000 Da to about 200,000 Da, measured according to ASTM D5296 using tetrahydrofuran as a solvent and a flow rate of 1 mL/min.

In aspects of this invention, it is directed to shaped articles. In certain embodiments, the shaped articles are not continuously extruded films that are infinite (or continuous) in one direction and fixed in width and thickness in the other two directions, as would be the case in a rolled film. In certain embodiments, a film or sheet can be converted into a shaped article, e.g., by thermoforming into a three-dimensional object, such as a cup or bowl. In embodiments of the invention, the shaped article is not a film or is not a sheet. In embodiments of the invention, the shaped articles can be chosen from injection molded articles, extrusion molded articles, rotational molded articles, compression molded articles, blow molded articles, injection blow molded articles, injection stretch blow molded articles, extrusion blow molded articles, sheet or film extrusion articles, profile extrusion articles, gas assist molding articles, structural foam molded articles, or thermoformed articles.

Shaped articles made from polymer-based resins according to the present invention can be shaped via molding or extruding for use in the transportation, appliance, electronics, building and construction, biomedical, packaging, and consumer markets. In embodiments of the invention, the shaped article is chosen from transparent articles, see-through articles, thin-walled articles, technical articles (e.g., articles having a complex design), articles having high design specifications, intricate design articles, articles made from molds that are difficult to fill under typical molding operations or conditions, wearable articles, body contact articles, containers (including containers for materials intended for body contact), food contact articles, household articles, general consumer products, packaging articles, medical articles, or components thereof.

In certain embodiments, the polymer-based resins can be primary molded into forms such as pellets, plates, and parisons, or can then also be secondary molded into sheets, thin-wall vessels, or thick-wall vessels. Thin-wall vessels can be processed into trays, blister packs, etc.; thick-wall vessels can be processed into bottles, gardening vessels, etc. Also, the polymer-based resins can be processed into daily necessaries such as hoses, pipes, etc. as well as industrial materials; cushioning materials, agricultural materials, etc. in the form of foamed bodies; industrial materials such as drainage materials, retaining walls, frame works, and plant protecting materials as well as vessels (for beverages, foods, mechanical or electrical products, agricultural products, medicines, or seedling pots) as usual moldings; household goods such as eating utensils, knives, forks, spoons, trays, wallpapers, facial tissue, wrapping cords, pillows, and expanded beads for cushioning; medical goods; office goods such as cylinder parts of pens, files, tack sheets, and protective films for CDs, electronic devices, and the like; information media materials such as cards; bodies of outdoor goods, sporting goods such as golf tees, and leisure goods, etc.

In embodiments, articles can include, for example, enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings; personal watercraft; jet-skis; pools; spas; hot tubs; steps; step coverings; building and construction applications such as glazing, roofs, windows, floors, decorative window furnishings or treatments; treated glass covers for pictures, paintings, posters, and like display items; wall panels, and doors; counter tops; protected graphics; outdoor and indoor signs; enclosures, housings, panels, and parts for automatic teller machines (ATM); computer; desk-top computer; portable computer; lap-top computer; hand held computer housings; monitor; printer; keyboards; FAX machine; copier; telephone; phone bezels; mobile phone; radio sender; radio receiver; enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; shoe laces; articles made from plastic-wood combinations; golf course markers; utility pit covers; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated painted articles; coated dyed articles; coated fluorescent articles; coated foam articles; and like applications.

In certain embodiments, articles that can be prepared according to the invention using the polymer-based resins, include, for example, automotive, aircraft, and watercraft exterior and interior components. Articles can include, but are not limited to, instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, circuit breakers, electrical and electronic housings, and running boards, automotive bezel, an automobile headlamp lens (e.g., an outer headlamp lens or an inner headlamp lens), or a headlamp assembly comprising: a headlamp lens; a headlamp reflector; a bezel; and a housing, or any combination thereof.

In certain embodiments, articles that utilize the polymer-based resins containing cellulose esters having higher HDT and improved mechanical properties as described herein can include vehicle interior parts (e.g., door handles, cup holders, dashboards, and glove boxes), appliance components, food and beverage containers, food and beverage container lids, electrical and electronic device enclosures (e.g., computer monitor enclosures, laptop enclosures, cellular phone enclosures), and the like, electrical and electronic device enclosures (e.g., computer monitor enclosures, laptop enclosures, cellular phone enclosures), and the like.

Additional examples of articles include disposable knives, forks, spoons, plates, cups, straws as well as eyeglass frames, toothbrush handles, toys, automotive trim, tool handles, camera parts, parts of electronic devices, razor parts, ink pen barrels, disposable syringes, bottles, and the like. In one embodiment, the compositions of the present invention are useful as plastics, films, and sheets. In embodiments, the compositions described herein are useful as plastics to make bottles, bottle caps, eyeglass frames, cutlery, disposable cutlery, cutlery handles, shelving, shelving dividers, electronics housing, electronic equipment cases, computer monitors, printers, keyboards, pipes, automotive parts, automotive interior parts, automotive trim, signs, thermoformed letters, siding, toys, thermally conductive plastics, ophthalmic lenses, tools, tool handles, utensils. In another embodiment, the compositions of the present invention described herein are suitable for use as films, sheeting, molded articles, medical devices, packaging, bottles, bottle caps, eyeglass frames, cutlery, disposable cutlery, cutlery handles, shelving, shelving dividers, furniture components, electronics housing, electronic equipment cases, computer monitors, printers, keyboards, pipes, toothbrush handles, automotive parts, automotive interior parts, automotive trim, signs, outdoor signs, skylights, multiwall film, thermoformed letters, siding, toys, toy parts, thermally conductive plastics, ophthalmic lenses and frames, tools, tool handles, and utensils, healthcare supplies, commercial foodservice products, boxes, film for graphic arts applications, and plastic film for plastic glass laminates.

The cellulose ester compositions described herein are useful in forming films, molded articles, and sheeting. The methods of forming the cellulose ester compositions into films, molded articles, and sheeting can be according to methods known in the art. Examples of potential molded articles include without limitation: medical devices, medical packaging, healthcare supplies, commercial foodservice products such as food pans, tumblers and storage boxes, bottles, food processors, blender and mixer bowls, utensils, water bottles, crisper trays, washing machine fronts, vacuum cleaner parts and toys. Other potential molded articles could include ophthalmic lenses and frames.

The invention further relates to articles of manufacture comprising the film(s) and/or sheet(s) containing cellulose ester compositions described herein. In embodiments, the films and/or sheets of the present invention can be of any thickness which would be apparent to one of ordinary skill in the art.

The invention further relates to the film(s) and/or sheet(s) described herein. The methods of forming the cellulose ester compositions into film(s) and/or sheet(s) can include known methods in the art. Examples of film(s) and/or sheet(s) of the invention including but not limited to extruded film(s) and/or sheet(s), calendered film(s) and/or sheet(s), compression molded film(s) and/or sheet(s). Methods of making film and/or sheet include but are not limited to extrusion, compression molding, wet block processing, and dry block processing.

As discussed herein, in certain embodiments of the invention, the polymer-based resins comprise at least one cellulose ester.

In embodiments, the cellulose ester utilized in this invention can be any that is known in the art. Cellulose esters that can be used for the present invention generally comprise repeating units of the structure:

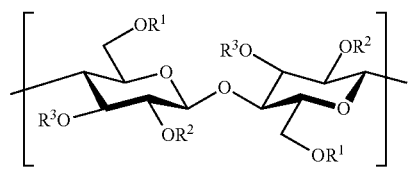

wherein $R^1$, $R^2$, and $R^3$ are selected independently from the group consisting of hydrogen or straight chain alkanoyl having from 2 to 10 carbon atoms. For cellulose esters, the substitution level is usually expressed in terms of degree of substitution (DS), which is the average number of non-OH substitutents per anhydroglucose unit (AGU). Generally, conventional cellulose contains three hydroxyl groups in each AGU unit that can be substituted; therefore, DS can have a value between zero and three. However, low molecular weight cellulose mixed esters can have a total degree of substitution slightly above 3, due to end group contributions. Native cellulose is a large polysaccharide with a degree of polymerization from 250-5,000 even after pulping and purification, and thus the assumption that the maximum DS is 3.0 is approximately correct. However, as the degree of polymerization is lowered, as in low molecular weight cellulose mixed esters, the end groups of the polysaccharide backbone become relatively more significant, thereby resulting in a DS that can range in excess of 3.0. Low molecular weight cellulose mixed esters are discussed in more detail subsequently in this disclosure. Because DS is a statistical mean value, a value of 1 does not assure that every AGU has a single substitutent. In some cases, there can be unsubstituted anhydroglucose units, some with two and some with three substitutents, and typically the value will be a non-integer. Total DS is defined as the average number of all of substitutents per anhydroglucose unit. The degree of substitution per AGU can also refer to a particular substitutent, such as, for example, hydroxyl, acetyl, butyryl, or propionyl.

In embodiments, the cellulose ester utilized can be a cellulose triester or a secondary cellulose ester. Examples of cellulose triesters include, but are not limited to, cellulose triacetate, cellulose tripropionate, or cellulose tributyrate. Examples of secondary cellulose esters include cellulose acetate, cellulose acetate propionate, and cellulose acetate butyrate.

In one embodiment of the invention, the cellulose ester can be chosen from cellulose acetate (CA), cellulose propionate (CP), cellulose butyrate (CB), cellulose acetate propionate (CAP), cellulose acetate butyrate (CAB), cellulose propionate butyrate (CPB), and the like, or combinations thereof. Examples of such cellulose esters are described in U.S. Pat. Nos. 1,698,049; 1,683,347; 1,880,808; 1,880,560; 1,984,147, 2,129,052; and 3,617,201, incorporated herein by reference in their entirety to the extent that they do not contradict the statements herein.

In embodiments of the invention, the cellulose esters have at least 2 anhydroglucose rings and can have between at least 50 and up to 5,000 anhydroglucose rings. The number of anhydroglucose units per molecule is defined as the degree of polymerization (DP) of the cellulose ester. In embodiments, cellulose esters can have an inherent viscosity (IV) of about 0.2 to about 3.0 deciliters/gram, or about 0.5 to about 1.8, or about 1 to about 1.5, as measured at a temperature of 25° C. for a 0.25 gram sample in 100 ml of a 60/40 by weight solution of phenol/tetrachloroethane. Examples of cellulose esters include, but are not limited to, cellulose acetate, cellulose propionate, cellulose butyrate, cellulose acetate propionate (CAP), cellulose acetate butyrate (CAB), cellulose propionate butyrate, and the like. In embodiments, cellulose esters useful herein can have a DS/AGU of about 2 to about 2.99, and the substituting ester can comprise either acetyl, propionyl and butyryl, or any combinations of these. In another embodiment of the invention, the total DS/AGU ranges from about 2 to about 2.99 and the DS/AGU of acetyl ranges from about 0 to 2.2, with the remainder of the ester groups comprising propionyl, butyryl or combinations thereof.

Cellulose esters can be produced by any method known in the art. Examples of processes for producing cellulose esters are taught in Kirk-Othmer, Encyclopedia of Chemical Technology, 5th Edition, Vol. 5, Wiley-Interscience, New York (2004), pp. 394-444. Cellulose, the starting material for producing cellulose esters, can be obtained in different grades and sources such as from cotton linters, softwood pulp, hardwood pulp, corn fiber and other agricultural sources, and bacterial cellulose, among others.

One method of producing cellulose esters is esterification of the cellulose by mixing cellulose with the appropriate organic acids, acid anhydrides, and catalysts. Cellulose is then converted to a cellulose triester. Ester hydrolysis is then performed by adding a water-acid mixture to the cellulose triester, which can then be filtered to remove any gel particles or fibers. Water is then added to the mixture to precipitate the cellulose ester. The cellulose ester can then be washed with water to remove reaction by-products followed by dewatering and drying.

The cellulose triesters to be hydrolyzed can have three substitutents selected independently from alkanoyls having from 2 to 10 carbon atoms. Examples of cellulose triesters include cellulose triacetate, cellulose tripropionate, and cellulose tributyrate or mixed triesters of cellulose such as cellulose acetate propionate, and cellulose acetate butyrate. These cellulose esters can be prepared by a number of methods known to those skilled in the art. For example, cellulose esters can be prepared by heterogeneous acylation of cellulose in a mixture of carboxylic acid and anhydride in the presence of a catalyst such as $H_2SO_4$. Cellulose triesters can also be prepared by the homogeneous acylation of cellulose dissolved in an appropriate solvent such as LiCl/DMAc or LiCl/NMP.

Those skilled in the art will understand that the commercial term of cellulose triesters also encompasses cellulose esters that are not completely substituted with acyl groups. For example, cellulose triacetate commercially available from Eastman Chemical Company, Kingsport, Tenn., U.S.A., typically has a DS from about 2.85 to about 2.99.

After esterification of the cellulose to the triester, part of the acyl substitutents can be removed by hydrolysis or by alcoholysis to give a secondary cellulose ester. As noted previously, depending on the particular method employed, the distribution of the acyl substitutents can be random or non-random. Secondary cellulose esters can also be prepared directly with no hydrolysis by using a limiting amount of acylating reagent. This process is particularly useful when the reaction is conducted in a solvent that will dissolve cellulose. All of these methods yield cellulose esters that are useful in this invention.

In one embodiment, the secondary cellulose esters useful in the present invention have an absolute weight average molecular weight (Mw) from about 5,000 to about 400,000 as measured by gel permeation chromatography (GPC) according to ASTM D6474. The following method is used to calculate the absolute weight average molecular weight values (Mw) for CE. The solvent is THF stabilized with BHT Preservative. The instrumentation for the THF/cellulose ester procedure consists of the following Agilent 1200 series components: degasser, isocratic pump, auto-sampler, column oven, UV/Vis detector and a refractive index detector. The test temperature is 30° C. and flow rate is 1.0 ml/min. A sample solution of 25 mg cellulose ester in 10 ml THF with BHT preservative and 10 µl toluene flow rate marker is made. The injection volume is 50 µl. The column set is Polymer Laboratories 5 µm PLgel, Guard+Mixed C+Oligopore. The detection is by refractive index. The calibrants are monodisperse polystyrene standards, Mw=580 to 3,220,000 from Polymer Laboratories. The universal calibration parameters are as follows: PS (K=0.0001280 and a=0.7120) and CE (K=0.00007572 and a=0.8424). The universal calibration parameters above were determined by light scattering and viscometery to yield the correct weight average molecular weights. In a further embodiment, the Mw is from about 15,000 to about 300,000. In yet further embodiments, the Mw ranges from about 10,000 to about 250,000; from about 15000 to 200000; from about 20,000 to about 150,000; from about 50,000 to about 150,000, or from about 70,000 to about 120,000.

The most common commercial secondary cellulose esters are prepared by initial acid catalyzed heterogeneous acylation of cellulose to form the cellulose triester. After a homogeneous solution in the corresponding carboxylic acid of the cellulose triester is obtained, the cellulose triester is then subjected to hydrolysis until the desired degree of substitution is obtained. After isolation, a random secondary cellulose ester is obtained. That is, the relative degree of substitution (RDS) at each hydroxyl is roughly equal.

Some examples of cellulose esters that can be useful in the present invention can be prepared using techniques known in the art and can be obtained from Eastman Chemical Company, Kingsport, Tenn., U.S.A., e.g., Eastman™ Cellulose Acetate Propionate CAP 482-20, Eastman™ Cellulose Acetate Propionate CAP 141-20, Eastman™ Cellulose Acetate Butyrate CAB 381-20, Cellulose Acetate Butyrate CAB 171-15 and Eastman™ Cellulose Acetate CA 398-30.

In embodiments, the cellulose esters utilized in this invention can also contain chemical functionality and are described herein as either derivatized, modified, or functionalized cellulose esters. Functionalized cellulose esters can be produced by reacting the free hydroxyl groups of cellulose esters with a bifunctional reactant that has one linking group for grafting to the cellulose ester and one functional group to provide a new chemical group to the cellulose ester. Examples of such bifunctional reactants include succinic anhydride which links through an ester bond and provides acid functionality; mercaptosilanes which links through alkoxysilane bonds and provides mercapto functionality; and isocyanotoethyl methacrylate which links through a urethane bond and gives methacrylate functionality.

In one embodiment of the invention, functionalized cellulose esters are produced by reacting the free hydroxyl groups of the cellulose esters with a bifunctional reactant producing a cellulose ester with at least one functional group selected from the group consisting of unsaturation (double bonds), carboxylic acids, acetoacetate, acetoacetate imide, mercapto, melamine, and long alkyl chains.

In one embodiment of the invention, the cellulose ester can be chosen from cellulose propionate (CP), cellulose butyrate (CB), cellulose acetate propionate (CAP), cellulose acetate butyrate (CAB), cellulose propionate butyrate (CPB), cellulose tripropionate (CTP), or cellulose tributyrate (CTB), but not from cellulose acetate (CA).

In embodiments, the polymer-based resin in accordance with the invention comprises a cellulose ester; and optionally a plasticizer, wherein when the plasticizer is present, the plasticizer is present at less than 20 wt % based on the total weight of the resin, wherein the resin has a heat distortion temperature that is in the range of from about 90° C. to about 140° C. according to ASTM D648 as measured at 1.82 MPa using a 3.2 mm thick bar subjected to 70° C. for 4 hours, and wherein the change in the weight average molecular weight ("$M_w$") due to injection molding is less than 30%, when the resin is injection molded with a barrel temperature of 260° C. with a residence time of 5 min.

In certain embodiments, where the polymer-based resin is a cellulose ester composition, the change in the weight average molecular weight ("$M_w$") due to injection molding is less than 25%, or less than 20%, or less than 15%, or less than 10%, when the resin is injection molded with a barrel temperature of 260° C. with a residence time of 5 min. In certain embodiments, the change in the weight average molecular weight ("$M_w$") due to injection molding is in the range from 0 to 25%, or from 0 to 20%, or from 0 to 15%, or from 0 to 10%, when the resin is injection molded with a barrel temperature of 260° C. with a residence time of 5 min.

In embodiments, where the polymer-based resin comprises a cellulose ester composition, the shaped article has low birefringence resulting in the substantial elimination of an unwelcomed rainbow effect that some plastics (e.g., engineered plastics) experience with polarized light. This low birefringence can improve the user experience with electronic device screens and retail displays. In embodiments, the shaped articles in accordance with the invention have a birefringence very close to articles molded with PMMA (e.g., articles molded with Evonik CYRO Acrylite H12) and significantly lower than articles molded with polyesters (e.g., Eastman Tritan TX1501HF) or polycarbonates (e.g., Covestro Makrolon 2458).

In embodiments, a salt stabilizer can be incorporated into the cellulose ester composition to stabilize the cellulose ester composition during processing. The cation component of the salt stabilizer is chosen from aluminum, calcium, magnesium, copper, cobalt, manganese, barium, strontium, zinc, tin, cadmium, chromium and iron cations; and the anion component of the salt stabilizer is an ($C_{6-20}$)alicyclic carboxylic acid, a ($C_{6-20}$)alkyl carboxylic acid, or a ($C_{6-20}$) alkenyl carboxylic acid. Examples of the ($C_{6-20}$)alicyclic carboxylic acid, the ($C_{6-20}$)alkyl carboxylic acid, or the ($C_{6-20}$)alkenyl carboxylic acid include naphthenic acid, abietic acid, cyclohexane carboxylic acid, cyclohexane propionic acid, 3-methyl-cyclopentyl acetic acid, 4-methylcyclohexane carboxylic acid, 2,2,6-trimethylcyclohexane carboxylic acid, 2,3-dimethylcyclopentyl acetic acid, 2-methylcyclopentyl propionic acid, palmitic acid, stearic acid, oleic acid, lauric acid, and the like. Examples of the salt stabilizers include strontium naphthenate, copper naphthenate, magnesium naphthenate, copper abietate, magnesium abietate, and the like.

In one embodiment, the cellulose ester composition further comprises a salt stabilizer in the range of from about 0.01 wt % to about 0.5 wt % based on the total weight of the composition. In one embodiment, the cellulose ester composition further comprises a salt stabilizer in the range of from about 0.01 wt % to about 0.4 wt % based on the total weight of the composition. In one embodiment, the cellulose ester composition further comprises a salt stabilizer in the range of from about 0.01 wt % to about 0.3 wt % based on the total weight of the composition. In one embodiment, the cellulose ester composition further comprises a salt stabilizer in the range of from about 0.01 wt % to about 0.2 wt % based on the total weight of the composition. In one embodiment, the cellulose ester composition further comprises a salt stabilizer in the range of from about 0.1 wt % to about 0.3 wt % based on the total weight of the composition. In one embodiment, the cellulose ester composition further comprises a salt stabilizer in the range of from about 0.01 wt % to about 0.1 wt % based on the total weight of the composition.

In embodiments of the invention, the polymer-based resin, e.g., where the polymer-based resin is a cellulose ester composition, can comprise antioxidants and acid stabilizers. Antioxidants are chemicals used to interrupt degradation processes during the processing of materials. Antioxidants are classified into several classes, including primary antioxidant, and secondary antioxidant.

"Primary antioxidants" are antioxidants that act by reacting with peroxide radicals via a hydrogen transfer to quench the radicals. Primary antioxidants generally contain reactive hydroxy or amino groups such as in hindered phenols and secondary aromatic amines. Examples of primary antioxidants include Irganox™ 1010, 1076, 1726, 245, 1098, 259, and 1425; Ethanox™ 310, 376, 314, and 330; Evernox™ 10, 76, 1335, 1330, 3114, MD 1024, 1098, 1726, 120, 2246, and 565; Anox™ 20, 29, 330, 70, IC-14, and 1315; Lowinox™ 520, 1790, 22IB46, 22M46, 44625, AH25, GP45, CA22, CPL, HD98, TBM-6, and WSP; Naugard™ 431, PS48, SP, and 445; Songnox™ 1010, 1024, 1035, 1076 CP, 1135 LQ, 1290 PW, 1330FF, 1330PW, 2590 PW, and 3114 FF; and ADK Stab AO-20, AO-30, AO-40, AO-50, AO-60, AO-80, and AO-330.

In one embodiment, the composition further comprises a primary antioxidant in the range of from 0 to about 1.0 wt % based on the total weight of the composition. In certain embodiments, the composition further comprises a primary antioxidant in the range of from about 0.1 to about 1.0 wt %, or from about 0.2 to about 1.0 wt %, or from about 0.3 to about 1.0 wt %, or about 0.4 to about 1.0 wt %, or from about 0.5 to about 1.0 wt %, or from about 0.6 to about 1.0 wt %, or from about 0.7 to about 1.0 wt %, or from about 0.8 to about 1.0 wt %, based on the total weight of the composition. In certain embodiments, the composition further comprises a primary antioxidant in the range of from about 0.1 to about 0.8 wt %, or from about 0.1 to about 0.6 wt %, or from about 0.1 to about 0.4 wt %, based on the total weight of the composition.

"Secondary antioxidants" are often called hydroperoxide decomposers. They act by reacting with hydroperoxides to decompose them into nonreactive and thermally stable products that are not radicals. They are often used in conjunction with primary antioxidants. Examples of secondary antioxidants include the organophosphorous (e.g., phosphites, phosphonites) and organosulfur classes of compounds. The phosphorous and sulfur atoms of these compounds react with peroxides to convert the peroxides into alcohols. Examples of secondary antioxidants include Ultranox 626, Ethanox™ 368, 326, and 327; Doverphos™ LPG11, LPG12, DP S-680, 4, 10, S480, and S-9228; Evernox™ 168 and 626; Irgafos™ 126 and 168; Weston™ DPDP, DPP, EHDP, PDDP, TDP, TLP, and TPP; Mark™ CH 302, CH 55, TNPP, CH66, CH 300, CH 301, CH 302, CH 304, and CH 305; ADK Stab 2112, HP-10, PEP-8, PEP-36, 1178, 135A, 1500, 3010, C, and TPP; Weston 439, DHOP, DPDP, DPP, DPTDP, EHDP, PDDP, PNPG, PTP, PTP, TDP, TLP, TPP, 398, 399, 430, 705, 705T, TLTTP, and TNPP; Alkanox 240, 626, 626A, 627AV, 618F, and 619F; and Songnox™ 1680 FF, 1680 PW, and 6280 FF.

In embodiments, the composition further comprises a secondary antioxidant in the range of from about 0.1 to about 0.8 wt %, or from about 0.2 to about 0.8 wt %, or from about 0.3 to about 0.8 wt %, or from about 0.4 to about 0.8 wt %, or from about 0.5 to about 0.8 wt %, or from about 0.6 to about 0.8 wt %, based on the total weight of the composition. In certain embodiments, the composition further comprises a secondary antioxidant in the range of from about 0.1 to about 0.7 wt %, or from about 0.1 to about 0.6 wt %, or from about 0.1 to about 0.5 wt %, or from about 0.1 to about 0.4 wt %, or from about 0.1 to about 0.3 wt %, based on the total weight of the composition. In certain embodiment, the composition further comprises a secondary antioxidant in the range of from about 0.3 to about 0.7 wt %, or from about 0.3 to about 0.6 wt %, based on the total weight of the composition.

"Acid scavengers" are additives that neutralize acids formed during the processing of polymers. Examples of acid scavengers include Hycite 713; Kisuma DHT-4A, DHT-4V, DHT-4A-2, DHT-4C, ZHT-4V, and KW2200; Brueggemann Chemical Zinc Carbonate RAC; Sipax™ AC-207; calcium stearate; Baerlocher GL 34, RSN, GP, and LA Veg; Licomont CAV 102; FACI Calcium Stearate DW, PLC, SP, and WLC; Hangzhou Hitech Fine Chemical: CAST, and ZnST; Songstab™ SC-110, SC-120, SC-130, SM-310, and SZ-210; Sun Ace SAK-CS, SAK-DSC, SAK-DMS, SAK-DZS, and SAK-KS; US Zinc Zinc Oxide 201, 205 HAS, 205H, 210, and 210E; Drapex™ 4.4, 6.8, 39, 391, 392, and 392S; Vikoflex™ 4050, 5075, 7170, 7190, 7040, 9010, 9040, and 9080; Joncryl™ ADR 4468, and ADR 4400; Adeka CIZER D-32; Epon™ 1001F, 1002F, and 1007F; Aralidite™ ECN 1299, 1273, 1280, 1299, and 9511; Dynamar RC 5251Q; and Nexamite PBO.

In embodiments, the composition further comprises an acid scavenger in the range of from about 0.2 to about 2.0 wt %, or from about 0.4 to about 2.0 wt %, or from about 0.6 to about 2.0 wt %, or from about 0.8 to about 2.0 wt %, or from about 1.0 to about 2.0 wt %, or from about 1.2 to about 2.0 wt %, or from about 1.4 to about 2.0 wt %, or from about 1.6 to about 2.0 wt %, or from about 1.8 to about 2.0 wt %, based on the total weight of the composition. In certain embodiments, the composition further comprises an acid scavenger in the range of from about 0.2 to about 1.8 wt %, or from about 0.2 to about 1.6 wt %, or from about 0.2 to about 1.4 wt %, or from about 0.2 to about 1.2 wt %, or from about 0.2 to about 1.0 wt %, or from about 0.2 to about 0.8 wt %, or from about 0.2 to about 0.6 wt %, or from about 0.2 to about 0.4 wt %, based on the total weight of the composition. In certain embodiments, the composition further comprises an acid scavenger in the range of from about 0.4 to about 1.8 wt %, or from about 0.6 to about 1.6 wt %, or from about 0.8 to about 1.4 wt %, or from about 0.8 to about 1.2 wt %, based on the total weight of the composition.

In one embodiment, the composition further comprises a secondary antioxidant in the range of from about 0.1 to about 0.8 wt % based on the total weight of the composition; and an acid scavenger in the range of from about 0.2 to about 2.0 wt % based on the total weight of the composition.

In one embodiment, the composition further comprises a primary antioxidant in the range of from about 0 to about 1.0 wt % based on the total weight of the composition; a secondary antioxidant in the range of from about 0.1 to about 0.8 wt % based on the total weight of the composition; and an acid scavenger in the range of from about 0.2 to about 2.0 wt % based on the total weight of the composition.

In one embodiment, the composition further comprises a secondary antioxidant in the range of from about 0.1 to about 0.8 wt % based on the total weight of the composition; an acid scavenger in the range of from about 0.2 to about 2.0 wt % based on the total weight of the composition; and an impact modifier in the range of from 0 to about 15 wt % based on the total weight of the composition.

In one embodiment, the composition further comprises a primary antioxidant in the range of from about 0 to about 1.0 wt % based on the total weight of the composition; a secondary antioxidant in the range of from about 0.1 to about 0.8 wt % based on the total weight of the composition; an acid scavenger in the range of from about 0.2 to about 2.0 wt % based on the total weight of the composition; and an impact modifier in the range of from 0 to about 15 wt % based on the total weight of the composition.

In embodiments of the invention, the impact modifier can be any material found to increase the impact strength of cellulose ester compositions. For purposes of this invention, an impact modifier is defined as any material in which at least one portion of its composition is an elastomer with a glass transition temperature (Tg) below room temperature. Tg can be measured for example according to ASTM D3418 using a TA 2100 Thermal Analyst Instrument using a scan rate of 20° C./min. Several classes of impact modifier fit this description. In one embodiment, the composition further comprises an impact modifier in the range of from 0 to about 15 wt % based on the total weight of the composition.

In one embodiment, the impact modifier can be selected from the class of materials known as modified polyolefins. In this class, the olefin is copolymerized with additional monomers that limit the crystallization of the polymer and increase the amount of the chain with Tg below room temperature and reduce the modulus below 500 MPa. Examples of modified olefins include EMA (examples include Elvaloy 4051, Lotader 3410 and Lotader 8900), EBA, EVA (examples include Levamelt 500, Levamelt 600, Levamelt 700, Levamelt 800, Elvax 40W, Evatane 28-40, Evatane 40-55, Evatane 18-150, Bynel E418 and Bynel 3101), EEA, EPDM (examples include Royaltuf 498), EPR, etc.

In one class of the embodiment, the impact modifier is a block copolymer in which at least one segment of the chain has a Tg below room temperature, referred to as the soft segment, and at least one segment of the chain has a Tg or Tm above room temperature, referred to as the hard segment. These block copolymers are also commonly referred to as thermoplastic elastomers (TPEs). Examples of block compolymers of this class include styrenic materials such as SBS, SEBS, and SIS (examples include Kraton G1657MS, Kraton FG1901 G and Kraton FG1924 G); thermoplastic urethanes (TPU) (examples include Elastolan 1170Z, Estane 2355, Estane ALR CL87A and Estane ALR 72A); polyester-ether copolymers (examples include Ecdel 9966 and Hytrel 3078) or polyamide-ether copolymers (examples include Pebax 5533).

In one embodiment, the impact modifier can be selected from the class of emulsion-prepared materials known as core-shell impact modifiers. In one embodiment, the impact modifier is a MBS core-shell impact modifier such as a methacrylate-butadiene-styrene that has a core made out of butadiene-styrene copolymers and shell made out of methyl methacrylate-styrene copolymer. In another embodiment, the impact modifier is an acrylic core-shell impact modifier that has a core made out of an acrylic polymer and shell from made from polymethylmethacrylate, such as methyl methacrylate-butyl acrylate.

In one embodiment of the invention, the core shell impact modifier is an MBS impact modifier that can comprise:
(A) from about 70 to about 85 parts of a core comprising from about 15 to about 35 percent by weight of units derived from at least one vinyl aromatic monomer, and from about 65 to about 85 percent by weight of units derived from at least one diolefin monomer;
(B) from about 8 to about 14 parts of an inner graft stage comprising at least one vinyl aromatic monomer or at least one C1-C4 alkyl methacrylate monomer;
(C) from about 0.1 to about 5 parts of an intermediate sealer stage comprising at least one monomer selected from a C1-C8 alkyl acrylate or a polyunsaturated crosslinker; and
(D) from about 10 to about 16 parts of an outer shell comprising at least one C1-C4 alkyl (meth)acrylate monomers or at least one vinyl aromatic monomer.

In embodiments, the MBS impact modifier can comprise graft polymer compositions comprising 10 to 70 percent by weight of a polymer or a copolymer of butadiene and grafts of firstly methyl(meth)acrylate and crosslinker, and secondly of styrene, and thirdly of methyl(meth)acrylate with an optional cross-linker.

Monomers suitable for polymerization with the conjugated diolefin and preferably with butadiene, can include alkenyl aromatic compounds and preferably vinyl aromatic compounds such as styrene, divinylbenzene, alpha-methyl styrene, vinyl toluene, hydrogenated styrene; lower (CZ-Cu) alkyl acrylates such as ethyl acrylate, n-propylacrylate, n-butyl acrylate, Z-methylbutylacrylate, 3-methylbutyl acrylate, amylacrylate, n-hexylacrylate, Z-ethylhexyl acrylate; lower (C2-C12) alkyl(meth)acrylates; acrylonitriles; olefins; and the like; or a combination of any of the foregoing.

Suitable cross-linking agents include divinylbenzene; di(meth)acrylates; diacrylates such as the diacrylate of mono-, di- or polyethylene glycol; their (meth)acrylates; divinyl sulfide; divinyl ether; vinyl acrylate; vinyl(meth) acrylate; trivinylbenzene; trimethylolpropane; tri(meth) acrylate; triallyl cyanurate and triallyl isocyanurate.

In one embodiment, the MBS core-shell impact modifier can comprise a copolymer of butadiene and styrene or a terpolymer of butadiene, styrene, and divinylbenzene. Although the relative amounts of the monomers which comprise the copolymeric substrate may vary, the butadiene component will typically comprise from about 30 to 100 parts by weight, the styrene component can comprise from 0 to about 70 parts by weight, and the divinylbenzene component can comprise from 0 to about 5 parts by weight based upon 100 parts by weight of butadiene, styrene, and divinylbenzene combined. In an embodiment, the copolymer substrate can comprise from about 50 to about 90 parts by weight of butadiene, from about 10 to about 50 parts by weight of styrene, and from 0 to about 5 parts by weight of divinylbenzene on the same basis, or from about 65 to about 85 parts by weight of butadiene, from about 15 to about 35 parts by weight of styrene, and from about 0.5 to about 2.0 parts by weight of divinylbenzene on the same basis.

Examples of methacrylate-butadiene-styrene core shell polymers are those described in, but not limited to, patents U.S. Pat. Nos. 4,446,585, 5,534,594, and 6,331,580. MBS core-shell impact modifiers can be obtained as Kane Ace B564 from Kaneka, Clearstrength from Arkema, Paraloid from Dow, and Visiomer from Evonik.

In one class of this embodiment, the impact modifier is an ABS core-shell impact modifier. Examples of ABS core-shell impact modifiers include an acrylonitrile-butadiene-styrene ABS core-shell impact modifier that has a core made out of butadiene-styrene copolymers and shell made out of acrylonitrile-styrene copolymer.

In one embodiment of the present invention, the core shell impact modifier is an acrylic impact modifier comprising about 25 to 95 weight percent of a first elastomeric phase polymerized from a monomer system comprising about 75 to 99.8 percent by weight of a ($C_1$ to $C_6$) alkyl acrylate, 0.1 to 5 percent by weight cross-linking monomer, and 0.1 to 5 percent by weight graft linking monomer, and about 75 to 5 weight percent of a final, rigid thermoplastic phase free of epoxy groups polymerized in the presence of said elastomeric phase.

Examples of useful acrylates are methyl acrylate, ethyl acrylate, butyl acrylate, 2-ethylhexyl acrylate and the like. In some embodiments, the acrylates are n-butyl acrylate and ethyl acrylate.

Examples of acrylic core shell polymers are those described in, but not limited to, patents U.S. Pat. Nos. 3,448,173, 3,655,825, and 3,853,968. Examples of suitable acrylic impact modifiers are Kane Ace EC0100 from Kaneka, Durastrength from Arkema, Elvaloy and Elvaloy HP from DuPont, and Paraloid from Dow.

In one embodiment, the impact modifier has a relatively neutral pH (e.g., pH between 6 and 8, preferably between 6.5 and 7.5). It is believed that this will help prevent the cellulose esters from degrading during the melt processing of the compositions.

In another embodiment, the refractive index (RI) of the impact modifiers is sufficiently close to that of the cellulose esters to provide a composition with high transmission and low haze. In one embodiment, the acrylic impact modifiers have a RI that close to the RI of the cellulose ester of about 1.46-1.50 to provide clear compositions. In embodiments, the impact modifier and cellulose ester components have a difference in refractive index, RI(second component)-RI(first component) (e.g., RI of CE-RI of impact modifier), of about 0.006 to about −0.0006, and the immiscible blend has a percent transmittance of at least 75%, and a haze of 10% or less more preferably 5% or less.

In embodiments, the composition further comprising the impact modifier has a percent transmittance of at least 75%, or at least 80%, or at least 85%, or at least 90%, or at least 95%. In one class of this embodiment, the composition further comprising the impact modifier has a percent haze of less than 10%. In embodiments, the composition further comprising the impact modifier has a percent haze of less than 8%, or less than 6%, or less than 5%.

In one embodiment, the impact modifier can be either a non-reactive impact modifier or a reactive impact modifier, or combination of both. It is believed that certain impact modifiers can also improve mechanical and physical properties of the cellulose ester compositions.

In one embodiment, where non-reactive impact modifiers are utilized, the impact modifier contains a first polymeric chain segment that is more chemically or physically compatible with the cellulose ester than another polymeric chain segment. In an embodiment, the first segment contains polar functional groups, which provide compatibility with the cellulose ester, including, but not limited to, such polar functional groups as ethers, esters, amides, alcohols, amines, ketones and acetals. Compatibility is defined by the preferential interaction of the first polymer chain segment with the cellulose ester polymer relative to the second segment and can mean molecular scale or microscale interactions. In one embodiment, the first segment is polyethylenevinyl acetate; polyoxyethylene or polyvinyl alcohol.

In embodiments, the second segment can be either saturated or unsaturated hydrocarbon groups or contain both saturated and unsaturated hydrocarbon groups. The second segment can be an oligomer or a polymer. In one embodiment of the invention, the second segment of the non-reactive impact modifier is selected from the group consisting of polyolefins, polydienes, polyaromatics, and copolymers. An example of a polyaromatic second segment is polystyrene. An example of a copolymer second segment is styrene/butadiene copolymer.

Examples of non-reactive impact modifiers include, but are not limited to, ethoxylated alcohols, ethoxylated alkylphenols, ethoxylated fatty acids, polyethylenevinyl acetate, block polymers of propylene oxide and ethylene oxide, ethylene/propylene terpolymers, functionalized polyolephins, polyglycerol esters, polysaccharide esters, and sorbitan esters. Examples of ethoxylated alcohols are $C_{11}$-$C_{15}$ secondary alcohol ethoxylates, polyoxyethylene cetyl ether, polyoxyethylene stearyl ether, and $C_{12}$-$C_{14}$ natural liner alcohol ethoxylated with ethylene oxide. $C_{11}$-$C_{15}$ secondary ethyoxylates can be obtained as Dow Tergitol® 15S from the Dow Chemical Company. Polyoxyethlene cetyl ether and polyoxyethylene stearyl ether can be obtained from ICI Surfactants under the Brij® series of products. $C_{12}$-$C_{14}$ natural linear alcohol ethoxylated with ethylene oxide can be obtained from Hoechst Celanese under the Genapol® series of products. Examples of ethoxylated alkylphenols include octylphenoxy poly(ethyleneoxy)ethanol and nonylphenoxy poly(ethyleneoxy)ethanol. Octylphenoxy poly(ethyleneoxy)ethanol can be obtained as Igepal® CA series of products from Rhodia, and nonylphenoxy poly(ethyleneoxy)ethanol can be obtained as Igepal CO series of products from Rhodia or as Tergitol® NP from Dow Chemical Company. Ethyoxylated fatty acids can include polyethyleneglycol monostearate or monolaruate which can be obtained from Henkel under the Nopalcol® series of products. Block polymers of propylene oxide and ethylene oxide can be obtained under the Pluronic® series of products from BASF. Polyglycerol esters can be obtained from Stepan under the Drewpol® series of products. Polysaccharide esters can be obtained from Henkel under the Glucopon® series of products, which are alkyl polyglucosides. Sorbitan esters can be obtained from ICI under the Tween® series of products.

In another embodiment of the invention, the non-reactive impact modifiers can be synthesized in situ in the cellulose ester composition by reacting cellulose ester-compatible compounds. These compounds can be, for example, telechelic oligomers, which are defined as prepolymers capable of entering into further polymerization or other reaction through their reactive end groups. In one embodiment of the invention, these in situ impact modifiers can have higher molecular weight (weight average molecular weight Mw) from about 10,000 to about 1,000,000.

In another embodiment of the invention, the impact modifier can be reactive. The reactive impact modifier can comprise a polymer or oligomer compatible with one component of the composition and functionality capable of reacting with another component of the composition. In embodiments, there are two types of reactive impact modifiers that can be used. The first reactive impact modifier has a hydrocarbon chain that is compatible with the cellulose ester and also has functionality capable of reacting with the cellulose ester. Such functional groups include, but are not limited to, carboxylic acids, anhydrides, acid chlorides, epoxides, and isocyanates. Specific examples of this type of reactive impact modifier include, but are not limited to: long chain fatty acids, such as, stearic acid (octadecanoic acid); long chain fatty acid chlorides, such as, stearoyl chloride (octadecanoyl chloride); long chain fatty acid anhydrides, such as, stearic anhydride (octadecanoic anhydride); epoxidized oils and fatty esters; styrene maleic anhydride copolymers; maleic anhydride grafted polypropylene; copolymers of maleic anhydride with olefins and/or acrylic esters, e.g. terpolymers of ethylene, acrylic ester and maleic anhydride; and copolymers of glycidyl methacrylate with olefins and/or acrylic esters, e.g. terpolymers of ethylene, acrylic ester, and glycidyl methacrylate.

Reactive impact modifiers can be obtained as SMA® 3000 styrene maleic anhydride copolymer from Sartomer/ Cray Valley, Eastman G-3015® maleic anhydride grafted polypropylene from Eastman Chemical Company, Epolene® E-43 maleic anhydride grafted polypropylene obtained from Westlake Chemical, Lotader® MAH 8200 random terpolymer of ethylene, acrylic ester, and maleic anhydride obtained from Arkema, Lotader® GMA AX 8900 random terpolymer of ethylene, acrylic ester, and glycidyl methacrylate, and Lotarder® GMA AX 8840 random terpolymer of ethylene, acrylic ester, and glycidyl methacrylate.

Modified polyolefin impact modifiers can be obtained as Lotader, Fusabond, Elvloy PTW, Lotryl, Elvaloy AC, Inter-Loy).

The second type of reactive impact modifier has a polar chain that is compatible with the cellulose ester and also has functionality capable of reacting with the cellulose ester. Examples of these types of reactive impact modifiers include cellulose esters or polyethylene glycols with olefin or thiol functionality. Reactive polyethylene glycol impact modifiers with olefin functionality include, but are not limited to, polyethylene glycol allyl ether and polyethylene glycol acrylate. An example of a reactive polyethylene glycol impact modifier with thiol functionality includes polyethylene glycol thiol. An example of a reactive cellulose ester impact modifier includes mercaptoacetate cellulose ester.

In embodiments of the invention, the amount of impact modifier in the cellulose ester composition can range from about 1 wt % to about 30 wt %, or from about 1 wt % to about 15 wt %, or from about 5 wt % to about 10 wt %, or from about 10 wt % to about 30 wt %, or from about 15 wt % to about 30 wt %, based on the weight of the cellulose ester composition.

In another embodiment of the invention, the cellulose ester compositions further comprise at least one additional polymeric component as a blend (with the cellulose ester) in an amount from 5 to 95 weight %, based on the total cellulose ester composition. Suitable examples of the additional polymeric component include, but are not limited to, nylon; polyesters; polyamides; polystyrene; other cellulose esters, cellulose ethers; polystyrene copolymers; styrene acrylonitrile copolymers; polyolephins; polyurethanes; acrylonitrile butadiene styrene copolymers; poly(methylmethacrylate); acrylic copolymers; poly(ether-imides); polyphenylene oxides; polyvinylchloride; polyphenylene sulfides; polyphenylene sulfide/sulfones; poly(ester-carbonates); polycarbonates; polysulfones; poly lactic add; poly butylenesuccinate; polysulfone ethers; and poly(ether-ketones) of aromatic dihydroxy compounds; or mixtures of any of the foregoing polymers. The blends can be prepared by conventional processing techniques known in the art, such as melt blending or solution blending.

In one embodiment of the invention, the composition can contain a plasticizer. The plasticizer utilized in this invention can be any that is known in the art that can reduce the glass transition temperature and/or the melt viscosity of the cellulose ester to improve melt processing characteristics. The plasticizer may be any plasticizer suitable for use with a cellulose ester. The plasticizer level should be lower than the normal (or typical) plasticizer level for cellulose esters; so that the compositions have higher Tg (or HDT) than fully plasticized cellulose ester compositions, good toughness and good flow. In embodiments, the plasticizer is present in an amount that does not substantially reduce the Tg (or HDT) of the cellulose ester composition compared to a similar composition without the plasticizer. In embodiments, the Tg (or HDT) does not change (e.g., reduce) more than 20%, or 15%, or 10%, or 5%, or 2%, as a result of including the plasticizer.

The plasticizer can be either monomeric or polymeric in structure. In one embodiment, the plasticizer is at least one selected from the group consisting of an aromatic phosphate ester plasticizer, alkyl phosphate ester plasticizer, dialkylether diester plasticizer, tricarboxylic ester plasticizer, polymeric polyester plasticizer, polyglycol diester plasticizer, polyester resin plasticizer, aromatic diester plasticizer, aromatic trimester plasticizer, aliphatic diester plasticizer, carbonate plasticizer, epoxidized ester plasticizer, epoxidized oil plasticizer, benzoate plasticizer, polyol benzoate plasticizer adipate plasticizer, a phthalate plasticizer, a glycolic acid ester plasticizer, a citric acid ester plasticizer, a hydroxyl-functional plasticizer, or a solid, non-crystalline resin plasticizer.

In one embodiment of the invention, the plasticizer can be selected from at least one of the following: triphenyl phosphate, tricresyl phosphate, cresyldiphenyl phosphate, octyldiphenyl phosphate, diphenylbiphenyl phosphate, trioctyl phosphate, tri butyl phosphate, diethyl phthalate, dimethoxyethyl phthalate, dimethyl phthalate, dioctyl phthalate, di butyl phthalate, di-2-ethylhexyl phthalate, butyl benzyl phthalate, dibenzyl phthalate, butyl phthalyl butyl glycolate, ethyl phthalyl ethyl glycolate, methyl phthalyl ethyl glycolate, triethyl citrate, tri-n-butyl citrate, acetyltriethyl citrate, acetyl-tri-n-butyl citrate, and acetyl-tri-n-(2-ethylhexyl) citrate, diethylene glycol dibenzoate, dipropylene glycol dibenozoate, or triethylene glycol dibenzoate.

In another embodiment of the invention, the plasticizer can be selected from at least one of the following: esters comprising: (i) acid residues comprising one or more residues of: phthalic acid, adipic acid, trimellitic acid, succinic acid, benzoic acid, azelaic acid, terephthalic acid, isophthalic acid, butyric acid, glutaric acid, citric acid or phosphoric acid; and (ii) alcohol residues comprising one or more residues of an aliphatic, cycloaliphatic, or aromatic alcohol containing up to about 20 carbon atoms.

In another embodiment of the invention, the plasticizer can be selected from at least one of the following: esters comprising: (i) at least one acid residue selected from the group consisting of phthalic acid, adipic acid, trimellitic acid, succinic acid, benzoic acid, azelaic acid, terephthalic acid, isophthalic acid, butyric acid, glutaric acid, citric acid and phosphoric acid; and (ii) at least one alcohol residue selected from the group consisting of aliphatic, cycloaliphatic, and aromatic alcohol containing up to about 20 carbon atoms.

In another embodiment of the invention, the plasticizer can comprise alcohol residues where the alcohol residues is at least one selected from the following: stearyl alcohol, lauryl alcohol, phenol, benzyl alcohol, hydroquinone, catechol, resorcinol, ethylene glycol, neopentyl glycol, 1,4-cyclohexanedimethanol, and diethylene glycol.

In another embodiment of the invention, the plasticizer can be selected from at least one of the following: benzoates, phthalates, phosphates, arylene-bis(diaryl phosphate), and isophthalates. In another embodiment, the plasticizer comprises diethylene glycol dibenzoate, abbreviated herein as "DEGDB".

In another embodiment of the invention, the plasticizer can be selected from at least one of the following: aliphatic polyesters comprising $C_{2-10}$ diacid residues, for example, malonic acid, succinic acid, glutaric acid, adipic acid, pimelic acid, suberic acid, azelaic acid, and sebacic acid; and $C_{2-10}$ diol residues.

In another embodiment, the plasticizer can comprise diol residues which can be residues of at least one of the following $C_2$-$C_{10}$ diols: ethylene glycol, diethylene glycol, 1,2-propylene glycol, 1,3-propylene glycol, 1,2-butylene glycol, 1,3-butylene glycol, 1,4-butylene glycol, neopentyl glycol, 1,5-pentanediol, 1,6 hexanediol, 1,5-pentylene glycol, triethylene glycol, and tetraethylene glycol.

In another embodiment of the invention, the plasticizer can include polyglycols, such as, for example, polyethylene glycol, polypropylene glycol, and polybutylene glycol. These can range from low molecular weight dimers and trimers to high molecular weight oligomers and polymers. In one embodiment, the molecular weight of the polyglycol can range from about 200 to about 2000.

In another embodiment of the invention, the plasticizer comprises at least one of the following: Resoflex® R296 plasticizer, Resoflex® 804 plasticozer, SHP (sorbitol hexapropionate), XPP(xylitol pentapropionate), XPA(xylitol pentaacetate), GPP(glucose pentaacetate), GPA (glucose pentapropionate) and APP (arabitol pentapropionate).

In another embodiment of the invention, the plasticizer comprises one or more of: A) from about 5 to about 95 weight % of a $C_2$-$C_{12}$ carbohydrate organic ester, wherein the carbohydrate comprises from about 1 to about 3 monosaccharide units; and B) from about 5 to about 95 weight % of a $C_2$-$C_{12}$ polyol ester, wherein the polyol is derived from a $C_5$ or $C_6$ carbohydrate. In one embodiment, the polyol ester does not comprise or contain a polyol acetate or polyol acetates.

In another embodiment, the plasticizer comprises at least one carbohydrate ester and the carbohydrate portion of the carbohydrate ester is derived from one or more compounds selected from the group consisting of glucose, galactose, mannose, xylose, arabinose, lactose, fructose, sorbose, sucrose, cellobiose, cellotriose and raffinose.

In another embodiment of the invention, the plasticizer comprises at least one carbohydrate ester and the carbohydrate portion of the carbohydrate ester comprises one or more of α-glucose pentaacetate, β-glucose pentaacetate, α-glucose pentapropionate, β-glucose pentapropionate, α-glucose pentabutyrate and β-glucose pentabutyrate.

In another embodiment, the plasticizer comprises at least one carbohydrate ester and the carbohydrate portion of the carbohydrate ester comprises an α-anomer, a β-anomer or a mixture thereof.

In another embodiment, the plasticizer can be selected from at least one of the following: propylene glycol dibenzoate, glyceryl tribenzoate, diethylene glycol dibenzoate, triethylene glycol dibenzoate, di propylene glycol dibenzoate, and polyethylene glycol dibenzoate.

In another embodiment of the invention, the plasticizer can be a solid, non-crystalline resin. These resins can contain some amount of aromatic or polar functionality and can lower the melt viscosity of the cellulose esters. In one embodiment of the invention, the plasticizer can be a solid, non-crystalline compound (resin), such as, for example, rosin; hydrogenated rosin; stabilized rosin, and their monofunctional alcohol esters or polyol esters; a modified rosin including, but not limited to, maleic- and phenol-modified rosins and their esters; terpene resins; phenol-modified terpene resins; coumarin-indene resins; phenolic resins; alkylphenol-acetylene resins; and phenol-formaldehyde resins.

In another embodiment of the invention, the plasticizer is at least one plasticizer selected from the group consisting of: triacetin, trimethyl phosphate, triethyl phosphate, tributyl phosphate, triphenyl phosphate, triethyl citrate, acetyl trimethyl citrate, acetyl triethyl citrate, acetyl tributyl citrate, tributyl-o-acetyl citrate, dibutyl phthalate, diaryl phthalate, diethyl phthalate, dimethyl phthalate, di-2-methoxyethyl phthalate, di-octyl phthalate, di-octyl adipate, dibutyl tartrate, ethyl o-benzoylbenzoate, ethyl phthalyl ethyl glycolate, methyl phthalyl ethyl glycolate, n-ethyltoluenesulfonamide, o-cresyl β-toluenesulfonate, aromatic diol, substituted aromatic diols, aromatic ethers, tripropionin, tribenzoin, polycaprolactone, glycerin, glycerin esters, diacetin, glycerol acetate benzoate, polyethylene glycol, polyethylene glycol esters, polyethylene glycol diesters, di-2-ethylhexyl polyethylene glycol ester, triethylene glycol bis-2-ethyl hexanoate, glycerol esters, diethylene glycol, polypropylene glycol, polyglycoldiglycidyl ethers, dimethyl sulfoxide, N-methyl pyrollidinone, $C_1$-$C_{20}$ dicarboxylic acid esters, dimethyl adipate, di-butyl maleate, di-octyl maleate, resorcinol monoacetate, catechol, catechol esters, phenols, epoxidized soy bean oil, castor oil, linseed oil, epoxidized linseed oil, other vegetable oils, other seed oils, difunctional glycidyl ether based on polyethylene glycol, γ-valerolactone, alkylphosphate esters, aryl phosphate esters, phospholipids, eugenol, cinnamyl alcohol, camphor, methoxy hydroxy acetophenone, vanillin, ethylvanillin, 2-phenoxyethanol, glycol ethers, glycol esters, glycol ester ethers, polyglycol ethers, polyglycol esters, ethylene glycol ethers, propylene glycol ethers, ethylene glycol esters, propylene glycol esters, polypropylene glycol esters, acetylsalicylic acid, acetaminophen, naproxen, imidazole, triethanol amine, benzoic acid, benzyl benzoate, salicylic acid, 4-hydroxybenzoic acid, propyl-4-hydroxybenzoate, methyl-4-hydroxybenzoate, ethyl-4-hydroxybenzoate, benzyl-4-hydroxybenzoate, diethylene glycol dibenzoate, dipropylene glycol dibenozoate, triethylene glycol dibenzoate, butylated hydroxytoluene, butylated hydroxyanisol, sorbitol, xylitol, ethylene diamine, piperidine, piperazine, hexamethylene diamine, triazine, triazole, pyrrole, and any combination thereof.

The amount of plasticizer in the cellulose ester composition can range from 0 to about 15 weight percent based on the weight of the cellulose ester composition. In one embodiment, the amount can range up to about 15 weight percent based on the weight of the cellulose ester composition. In another embodiment, the amount can range up to about 10 weight percent based on the weight of the cellulose ester composition. In another embodiment, the amount can range up to about 5 weight percent based on the weight of the cellulose ester composition, or up to about 3 weight percent based on the weight of the cellulose ester composition, or less than 2 weight percent based on the weight of the cellulose ester composition.

In another embodiment of the invention, the composition contains no plasticizer. In one embodiment, the cellulose ester composition comprises a cellulose ester that is CAP and no plasticizer. In one embodiment, the cellulose ester composition comprises a cellulose ester that is CAB and no plasticizer.

In another embodiment of the invention, the composition is melt processable. Melt processability generally refers to the ability to thermally process the materials below their degradation temperature to obtain homogeneous pellets or plastic articles. For example, the compositions described can be melt extruded on a Werner & Pflerderer 30 mm twin screw extruder at a throughput of 35 lbs/hour with screw speed of 250 rpm and barrel temperature of 240° C. injection molded on a Toyo 110 injection molding machine with barrel temperature of 240° C. and mold temperature of 160° F. with minimal molecular weight or color degradation.

In one embodiment of this invention, a melt processable cellulose ester composition is provided comprising 1 to 30 wt %, or 1 to 15 wt %, or 2 to 10 wt % of impact modifiers and no plasticizer, the cellulose ester composition having a heat deflection temperature (HDT) value of greater than 95° C. (measured according to ASTM D648 at a 1.82 MPa stress level after conditioning for 4 hours at 70° C.), and notched Izod impact strength value of greater than 80 J/m (measured according to ASTM D256 on 3.2 mm thick bars at 23° C.), and spiral flow values of at least 15 inches at 240 C when measured using the procedure described herein. In one embodiment, the cellulose ester composition has a Tg value measured at 20 C/min according to ASTM D3418 of greater than 120° C.

In another embodiment of the invention, the compositions have a melt viscosity at 240° C. and 400 rad/s of 10,000 1/s or below measured by a plate-plate melt rheometer such as aRheometrics Dynamic Analyzer (RDA II) with 25 mm diameter parallel plates, 1 mm gap and 10% strain measured in accordance with ASTM D4440 using frequency scan of between 1 rad/sec and 400 rad/sec.

In one embodiment, the melt processable cellulose ester compositions comprise 0 to 30 wt %, or 0 to 15 wt % of impact modifiers, 0 to 15 wt % of plasticizers, and have a Tg greater than 90° C. In another embodiment, the melt processable cellulose ester compositions comprise 0 to 30 wt %, or 0 to 15 wt % of impact modifiers, 0 to 10 wt % of plasticizers, and have a Tg greater than 100° C. In yet another embodiment, melt processable cellulose ester compositions comprise 0 to 10 wt % of impact modifiers, 0 to 10 wt % of plasticizers, and have a Tg greater than 100° C. In another embodiment, melt processable cellulose ester compositions comprise 0 to 10 wt % of impact modifiers, 0 to 5 wt % of plasticizers, and have a Tg greater than 115° C.

In another embodiment of the invention, the cellulose ester compositions have a Tg or Heat deflection temperature (HDT at 0.455 psi) similar to that of the base cellulose ester polymer with a drop of only a few degrees Celsius (e.g., less than 5° C., or less than 2° C.) with the incorporation of an impact modifier and no plasticizer. Impact properties of these composition can also exceed 80 J/m (notched Izod impact strength at 23° C.).

In embodiments of the invention, the polymer-based resin has a heat distortion temperature ("HDT") greater than 90° C., or greater than 95° C., according to ASTM D648 as measured at 1.82 MPa using a 3.2 mm thick bar that was subjected to 70° C. for 4 hours. In certain embodiments, the polymer-based resin has a heat distortion temperature ("HDT") of at least 95° C., at least 100° C., at least 105° C., or at least 110° C., or at least 115° C. In certain embodiments, the polymer-based resin has a heat distortion temperature ("HDT") in the range from 90° C. to 140° C., 90° C. to 130° C., 90° C. to 120° C., 90° C. to 110° C., 95° C. to 140° C., 95° C. to 130° C., 95° C. to 120° C., 95° C. to 110° C., 95° C. to 105° C., 100° C. to 140° C., 100° C. to 130° C., 100° C. to 120° C., 100° C. to 110° C., 105° C. to 140° C., 105° C. to 130° C., 105° C. to 120° C., 105° C. to 115° C., 105° C. to 110° C., 110° C. to 140° C., 110° C. to 130° C., 110° C. to 125° C., 110° C. to 120° C., 110° C. to 115° C., 115° C. to 140° C., 115° C. to 130° C., 120° C. to 140° C., 120° C. to 130° C., or 120° C. to 125° C.

In embodiments of the invention, the polymer-based resin has a notched izod impact strength of at least 80 J/m, or at least 90 J/m, or at least 100 J/m, or at least 110 J/m, or at least 120 J/m, or at least 130 J/m, or at least 140 J/m, or at least 150 J/m, or at least 160 J/m, or at least 170 J/m, or at least 180 J/m, or at least 190 J/m, or at least 200 J/m, as measured according to ASTM D256 using a 3.2 mm thick bar that has been subjected to 50% relative humidity for 48 hours at 23° C. In certain embodiments, the polymer-based resin has a notched izod impact strength in the range of from about 80 J/m to about 500 J/m, from about 80 J/m to about 400 J/m, from about 80 J/m to about 300 J/m, from about 80 J/m to about 200 J/m, from about 100 J/m to about 500 J/m, from about 100 J/m to about 400 J/m, from about 100 J/m to about 300 J/m, from about 100 J/m to about 200 J/m, from about 120 J/m to about 500 J/m, from about 120 J/m to about 400 J/m, from about 120 J/m to about 300 J/m, from about 120 J/m to about 200 J/m, from about 150 J/m to about 500 J/m, from about 150 J/m to about 400 J/m, from about 150 J/m to about 300 J/m, from about 150 J/m to about 200 J/m, from about 170 J/m to about 500 J/m, from about 170 J/m to about 400 J/m, from about 170 J/m to about 300 J/m, from about 170 J/m to about 200 J/m, from 180 J/m to about 500 J/m, from about 180 J/m to about 400 J/m, from about 180 J/m to about 300 J/m, from about 180 J/m to about 200 J/m, from 190 J/m to about 500 J/m, from about 190 J/m to about 400 J/m, from about 190 J/m to about 300 J/m, from about 190 J/m to about 200 J/m, from 200 J/m to about 500 J/m, from about 200 J/m to about 400 J/m, or from about 200 J/m to about 300 J/m, as measured according to ASTM D256 using a 3.2 mm thick bar that has been subjected to 50% relative humidity for 48 hours at 23° C.

In another embodiment of the invention, the cellulose ester compositions further comprise at least one additive selected from the group comprising antioxidants, thermal stabilizers, mold release agents, antistatic agents, whitening agents, colorants, flow aids, processing aids, plasticizers, anti-fog additives, minerals, UV stabilizers, lubricants, chain extenders, nucleating agents, reinforcing fillers, wood or flour fillers, glass fiber, carbon fiber, flame retardants, dyes, pigments, colorants, additional resins and combinations thereof.

In embodiments, mixing of the impact modifiers, cellulose esters, and the optional plasticizers and any additives can be accomplished by any method known in the art that is adequate to disperse the impact modifiers, plasticizers and additives into the cellulose esters. Examples of mixing equipment include, but are not limited to, Banbury mixers, Brabender mixers, roll mills, and extruders (single or twin screw). The shear energy during the mixing is dependent on the combination of equipment, blade design, rotation speed (rpm), and mixing time. The shear energy should be sufficient to disperse the impact modifier throughout the cellulose ester.

In embodiments, the cellulose ester, impact modifier, plasticizer and additives can be combined in any order during the process. In one embodiment, the cellulose ester is premixed with the impact modifier and/or the plasticizer. The cellulose ester containing the impact modifier and/or the plasticizer is then mixed with the additives. In another embodiment of the invention, when reactive impact modifiers are utilized, the reactive impact modifiers can be mixed with the cellulose esters first, and then the other components are added.

In certain embodiments of the invention, the cellulose ester compositions contain 2 wt %-15 wt % impact modifier, based on the total weight of the cellulose ester composition, and have HDT values greater than 95 C, and notched Izod impact strength values greater than 80 J/m, and viscosities at 240 C and 400 rad/sec greater than 10,000 P.

In another embodiment, cellulose ester compositions are provided that have a total DS/AGU in the range from about 2 to about 2.99 and the DS/AGU of acetyl ranges from about 0 to about 2.2, with the remainder of the ester groups comprising propionyl, butyryl or combinations thereof.

In other embodiments, the melt processable cellulose ester compositions described above, optionally contain some plasticizer. In embodiments, the plasticizer is present in an amount that does not substantially reduce the HDT of the cellulose ester composition compared to a similar composition without the plasticizer. In embodiments, the HDT does not change (e.g., reduce) more than 10%, or 5%, or 2%, as a result of including the plasticizer.

In one aspect, the invention is directed to an injection molded article comprising a thin-walled body portion formed from a polymer-based resin derived from cellulose, wherein the thin-walled body portion comprises:
i. a gate position;
ii. a last fill position;
iii. a flow length to wall thickness ratio greater than or equal to 100, wherein the flow length is measured from the gate position to the last fill position; and
iv. a wall thickness less than or equal to about 2 mm; and
wherein the polymer-based resin has an HDT or at least 90 C, or at least 95 C, a bio-derived content of at least 20 wt %, or at least 40 wt %, and a spiral flow length of at least 3.0 cm, when the polymer-based resin is molded with a spiral flow mold with the conditions of a barrel temperature of 238° C., a melt temperature of 246° C., a molding pressure of 13.8 MPa, a mold thickness of 0.8 mm, and a mold width of 12.7 mm. In embodiments, the polymer-based resin has a spiral flow length of at least 4.0, or at least 5.0 cm.

In one embodiment of the injection molded article, the polymer-based resin further comprises at least one property chosen from: flexural modulus of greater than 1900 MPa as measured according to ASTM D790 using a 3.2 mm thick bar hat has been subjected to 50% relative humidity for 48 hours at 23° C.; a notched izod impact strength of greater than 80 J/m as measured according to ASTM D256 using a 3.2 mm thick bar hat has been subjected to 50% relative humidity for 48 hours at 23° C.; a flex creep deflection of less than 12 mm, measured using a molded bar having dimensions of 5" length, 0.5" width, and 0.125" thickness positioned horizontally on a fixture with a 4" span, inside a dry oven for 68 hours at 90° C. with a nominal 500 psi stress on the center of the span; a transmission of at least 70 measured according to ASTM D1003 using a 3.2 mm plaque after injection molding at a barrel set point of 249° C. and a residence time of 5 min; a ΔE value of less than 25, using a 3.2 mm plaque after injection molding with a barrel temperature of 249° C. and a residence time of 5 min; or an L* color of at least 85, measured according to ASTM E1348 using a 3.2 mm plaque after injection molding with a barrel temperature of 249° C. and a residence time of 5 min. In embodiments, the polymer-based resin comprises at least 2, or at least 3 of the listed properties. In embodiments, the polymer-based resin contains less than 5 wt %, or less than 4 wt %, or less than 3 wt %, or less than 2 wt %, or less than 1 wt %, or has no added plasticizer.

By "wall thickness" is meant the average wall thickness of the thin-walled body portion, unless specified otherwise. In one embodiment, the wall thickness can be the average wall thickness of the entire molded article. In one embodiment, the wall thickness is substantially constant.

The "gate position" is the point where the gate is located where the injection molding polymer enters the mold during the injection molding process. Various types of gates can be employed for preparing molded articles, such as for example, side gates, spoke gates, pin gates, submarine gates, film gates, disk gates, or any combination thereof.

The "last fill position" is the location in the mold cavity furthest from the gate position, where polymer is intended to fill during injection molding.

The "gate size" is the diameter of the gate opening, when it is a circular gate. For non-circular gate openings, it is the effective diameter, or smallest dimension of the opening.

In embodiments, the gate position comprises a gate having a gate size, wherein ratio of gate size to wall thickness is 1:1 or less, or 0.9:1 or less, 0.8:1 or less, or 0.7:1 or less, or 0.6:1 or less, or 0.5:1 or less. In embodiments, the gate position comprises a gate having a gate size, wherein ratio of gate size to wall thickness is in the range from 1:1 to 0.1:1, or 0.9:1 to 0.1:1, or 0.8:1 to 0.1:1, or 0.7:1 to 0.1:1, or 0.6:1 to 0.1:1, or 0.5:1 to 0.1:1.

In embodiments, the gate size is 1.0 mm or less, or 0.9 mm or less, 0.8 mm or less, or 0.7 mm or less, 0.6 mm or less, or 0.5 mm or less. In embodiments, the wall thickness is 1.9 mm or less, or 1.8 mm or less, 1.7 mm or less, or 1.6 mm or less, 1.5 mm or less, or 1.4 mm or less, or 1.3 mm or less, 1.2 mm or less, or 1.1 mm or less, 1.0 mm or less, or 0.9 mm or less, 0.8 mm or less, or 0.7 mm or less, 0.6 mm or less, or 0.5 mm or less.

In certain embodiments, the flow length to wall thickness ratio is at least 100, or at least 150, or at least 200, or at least 250, or at least 300, or at least 350, or at least 400, or at least 450, or at least 500, wherein the flow length is measured from the gate position to the last fill position. In certain embodiments, the flow length to wall thickness ratio is in the range from 100 to 1500, or from 100 to 1250, or from 100 to 1000, or from 100 to 750, or from 150 to 1500, or from 150 to 1250, or from 150 to 1000, or from 150 to 750, or from 200 to 1500, or from 200 to 1250, or from 200 to 1000, or from 200 to 750, or from 250 to 1500, or from 250 to 1250, or from 250 to 1000, or from 250 to 750, or from 300 to 1500, or from 300 to 1250, or from 300 to 1000, or from 300 to 750, or from 350 to 1500, or from 350 to 1250, or from 350 to 1000, or from 350 to 750, or from 400 to 1500, or from 400 to 1250, or from 400 to 1000, or from 400 to 750, or from 450 to 1500, or from 450 to 1250, or from 450 to 1000, or from 450 to 750, or from 500 to 1500, or from 500 to 1250, or from 500 to 1000, or from 500 to 750, wherein the flow length is measured from the gate position to the last fill position.

In embodiments of the invention, the molded article has a flow length to wall thickness ratio in excess of 450 with wall thicknesses of less than about 1.0 millimeter, such as ratios from about 450 to about 1500; ratios in excess of about 350 with wall thicknesses of less than about 0.75 millimeter, such as ratios from about 350 to about 1250; ratios in excess of about 200 with wall thicknesses of less than about 0.5 millimeter, such as ratios from about 300 to about 1000; ratios in excess of about 200 with wall thicknesses of less than about 1 millimeter, such as ratios from about 200 to about 1000; ratios in excess of about 200 with wall thicknesses of less than about 0.375 millimeter, such as ratios from about 250 to about 750; and ratios in excess of about 150 with wall thicknesses of less than about 0.25 millimeter, such as ratios from about 150 to about 500.

In embodiments, the polymer-based resin forming the injection molded article is chosen from any of the cellulose ester compositions discussed herein. In one embodiment, the resin is a cellulose ester composition comprising CAP, a secondary antioxidant, and an acid scavenger, and having an HOT greater than 95° C. In one embodiment, this cellulose ester composition further comprises 1 to 30 wt % of an impact modifier, less than 2 wt % of a plasticizer, or no plasticizer, and less than 5 wt %, or less than 2 wt % of any other additives.

This invention can be further illustrated by the following examples of preferred embodiments thereof, although it will be understood that these examples are included merely for purposes of illustration and are not intended to limit the scope of the invention unless otherwise specifically indicated.

EXAMPLES

This invention can be further illustrated by the following examples of embodiments thereof. These examples are included merely for purposes of illustration and are not intended to limit the scope of the invention unless otherwise specifically indicated.

Abbreviations

Ex is example(s); CA is cellulose acetate; CAB is cellulose acetate butyrate; CAP is cellulose acetate propionate; % H is percent haze; % T is percent transmission; $M_w$ is absolute weight average molecular weight, $\Delta M_w\%$ is change in absolute weight average molecular weight; % H is percent haze; RH is relative humidity; ° C. is Degree(s) Celsius; min is minute(s); ° F. is Degree(s) Fahrenheit; Comp. Ex. is comparative example; Pz is plasticizer; Antiox. is antioxidant; SNMO is AKCROSTAB SN-MO; Temp. is temperature; min is minute; NPPP is WESTON Neopentylphenylphosphite; Prim. Is primary; IM is impact modifier; Scav. is scavenger; Stab. Is stabilizer; CE is cellulose ester; oz is ounce; in/sec is inch/second; sec or s is second(s); psi is pounds per square inch; BSP is barrel set point; RT is residence time.

General Procedure for Preparation of Compositions

The examples were prepared by pre-mixing the cellulose ester powder with additives such as stabilizers, impact modifiers and plasticizers at room temperature for 20 minutes in a Hobart mixer.

Example 1

Example 1 was prepared by mixing Eastman™ CAP 482-20 (18.484 lb, 92.42 wt %), ECO 100 (1.2 lb, 6.0 wt %), IRGANOX 1010 (0.05 lb, 0.25 wt %), IRGAFOS 168 (0.066 lb, 0.33 wt %), DRAPEX 4.4 (0.194 lb, 0.97 wt %), SNMO (0.0006 lb, 0.03 wt %) in a Hobart mixer for 20 minutes at room temperature.

A series of compositions were made to determine the effect of different stabilizers on critical properties as noted in the examples in Table 1. The base material used for these examples was Eastman™ CAP 482-20.

TABLE 1

| EX # | CE, Wt % | IM, (Wt %) | Prim. Antiox., (Wt %) | Second. Antiox., (Wt %) | Acid Scav., (Wt %) | Salt Stab., (Wt %) |
|---|---|---|---|---|---|---|
| 2 | CAP 482-20 (98.98) | | | NPPP (0.10) | DRAPEX 4.4 (0.90) | SNMO (0.02) |
| 3 | CAP 482-20 (92.98) | ECO100 (6.0) | | NPPP (0.10) | DRAPEX 4.4 (0.90) | SNMO (0.02) |
| 4 | CAP 482-20 (92.97) | ECO100 (6.0) | | ULTRANOX 626 (0.33%) | DRAPEX 4.4 (0.68) | SNMO (0.02) |
| 5 | CAP 482-20 (98.97) | | | ULTRANOX 626 (0.33) | DRAPEX 4.4 (0.68) | SNMO (0.02) |
| 6 | CAP 482-20 (92.72) | ECO100 (6.0) | IRGANOX 1010 (0.25) | ULTRANOX 626 (0.33) | DRAPEX 4.4 (0.68) | SNMO (0.02) |
| 7 | CAP 482-20 (92.47) | ECO100 (6.0) | IRGANOX 1010 (0.50) | ULTRANOX 626 (0.33) | DRAPEX 4.4 (0.68) | SNMO (0.02) |
| 8 | CAP 482-20 (92.42) | ECO100 (6.0) | IRGANOX 1010 (0.25) | ULTRANOX 626 (0.33) | DRAPEX 4.4 (0.97) | SNMO (0.03%) |
| 9 | CAP 482-20 (92.72) | ECO100 (6.0) | IRGANOX 1010 (0.25) | ULTRANOX 626 (0.33) | DRAPEX 4.4 (0.68) | SNMO (0.02) |
| 10 | CAP 482-20 (92.42) | ECO100 (6.0%) | IRGANOX 1010 (0.25) | ULTRANOX 626 (0.33) | VIKOFLEX 7170 (0.97) | SNMO (0.03) |
| 11 | CAP 482-20 (92.17) | ECO100 (6.0%) | IRGANOX 1010 (0.50) | ULTRANOX 626 (0.33) | VIKOFLEX 7170 (0.97) | SNMO (0.03) |
| 12 | CAP 482-20 (98.17) | | IRGANOX 1010 (0.50) | ULTRANOX 626 (0.33) | DRAPEX 4.4 (0.97) | SNMO (0.03) |
| 13 | CAP 482-20 (92.17) | ECO100 (6.0) | IRGANOX 1010 (0.50) | ULTRANOX 626 (0.33) | DRAPEX 4.4 (0.97) | SNMO (0.03) |

Comp. Ex. 1 is a control and is a typical Plasticized CE formulation made from CAP 482-20, and is comparative due to low HDT. Comp. Ex. 2 was prepared by adapting the previously disclosed procedures, and is comparative for embodiments of the invention requiring low ΔE and/or high transmission. The base material used for these comparative examples was Eastman™ CAP 482-20.

TABLE 2

Comp. Ex. 1-4

| Comp. EX # | CE, (Wt %) | Pz, (Wt %) | IM, (Wt %) | Prim. Antiox., (Wt %) | Second. Antiox., (Wt %) | Acid Scav., (Wt %) | Salt Stab., (Wt %) |
|---|---|---|---|---|---|---|---|
| 1 | CAP 482-20 (93.0) | DOA (6.0) | | | NPPP (0.10) | DRAPEX 4.4 (0.8) | SNMO (0.02) |
| 2 | CAP 482-20 (92.17) | | ECO100 (6.0) | IRGANOX 1010 (0.50%)/ LOWINOX 44B25 (0.33) | | DRAPEX 4.4 (0.97) | SNMO (0.03) |
| 3 | CAP 482-20 (88.0) | DOA (11.1) | | | NPPP (0.09) | DRAPEX 4.4 (0.8) | SNMO (0.02) |
| 4 | CA 398-30 (73.0) | DEP (26.2) | | t-Butyl Phenol (0.29) | NPPP (0.05) | DRAPEX 4.4 (0.4) | SNMO (0.01) |

Pellet Production

The premixed material (Ex 1-13 and Comp. Ex. 1-4) was then fed into the throat of a Davis-Standard 32 mm extruder and compounded at a throughput of 40 lb/hour with screw speed of 300 rpm and barrel temperature of 225° C. for the Eastman™ CAP 482-20 based compositions to produce pellets.

Plaque Production

Pellets of the compounded material were injection molded in a 150 Ton Toyo injection molding machine with a barrel capacity of 6.7 oz at 1 in/sec injection speed into two 4 inch×4 inch×0.126 (10.2 cm×10.2 cm×0.32 cm) plaques per shot with barrel temperature nominally of 249° C. (480° F.) or 260° C. (500° F.) with a residence time of 2 min or 5 min, and a mold temperature of 80° C.

Test Bar Production

Pellets of the compounded material were injection molded to form standard test bars 0.5 inch×5 inch×0.125 inch (1.27 cm×12.7 cm×0.3 cm). The pellets were molded in A 110 Ton Toyo injection molding machine with barrel capacity 3.4 oz. The compounded material is typically injection molded at 1 in/sec injection speed into four test bars per shot with barrel temperature nominally of 249° C. (480° F.) and mold temperature of 80° C.

Test Methods

Samples were evaluated using standard ASTM test methods with any special conditions noted below.

TABLE 3

Test Methods

| PROPERTY | COMMENTS |
|---|---|
| Color, b* (ASTM E1348) | Using 3.2 mm thick plaques. Measured using Hunter Lab Ultrascan Spectra Colorimeter |
| Color, a* (ASTM E1348) | Using 3.2 mm thick plaques. Measured using Hunter Lab Ultrascan Spectra Colorimeter |
| Color, L* (ASTM E1348) | Using 3.2 mm thick plaques. Measured using Hunter Lab Ultrascan Spectra Colorimeter |
| Haze (ASTM D1003) | Using 3.2 mm plaques |
| Transmission (ASTM D1003) | Using 3.2 mm plaques |
| Δ $M_w$ % (GPC) | % Change in Absolute Weight Average Molecular Weight From Pellet To Plaque or Test Bar Based On Pellet Absolute Molecular Weight |
| Izod Notched Impact at 23° C. (ASTM D256) | Using a 0.32 mm thick bar that has been subjected to 50% relative humidity at 23° C. for 48 hours. |
| HDT 1.82 MPa (ASTM D648) | Using a 0.32 mm thick bar subjected to 70° C. for 4 hours. |
| Flexural Modulus (ASTM D790) | Using a 1.3 cm × 12.7 cm × 0.3 mm bar subjected to 50% Relative humidity for 48 hours at 23° C. |
| Absolute Weight Average Molecular Weight (ASTM D5296) | Using tetrahydrofuran stabilized with BHT as a solvent and a flow rate of 1 mL/min. |

Spiral Flow 3.2 mm Thick Bar

A reciprocating screw injection molding machine having 110 tons of clamping force with a screw diameter of 32 mm was equipped with a water-cooled, cold runner mold with a spiral-shaped cavity having dimensions of 0.50" wide× 0.125" deep×60.00" in length. The cavity was fed via a 3.5" long cold sprue with a nominal 0.400" diameter and 3-degree taper, followed by a 1.0" long cold runner with 0.30" nominal diameter, followed by a rectangular gate 0.25" wide×0.050" thick×0.10" long. Variables controlled for the range of experimentation included resin drying, injection unit barrel temperature, mold temperature, initial injection speed, injection pressure limit, screw rotation speed and back pressure on screw recovery, injection time, and cycle time.

For each combination of variables, responses included actual melt temperature and distance of melt travel in the spiral-shaped cavity, excluding the runner and gate. The injection process was allowed to stabilize at each set of conditions—typically 10 to 15 shots—and then 10 molded specimens were collected for an average reported flow length.

All materials were molded using pressure control, with mold temperature of 80 F, initial injection speed of 1 in/s, injection unit pressure limit of 1000 psi, injection time of 10 s, cycle time of 38 s, maximum cushion of 0.1", screw recovery rotation speed of 150 rpm, and screw recovery back pressure of 100 psi.

0.8 mm Thick Bar

A reciprocating screw injection molding machine having 110 tons of clamping force with a screw diameter of 32 mm was equipped with a water-cooled, cold runner mold with a spiral-shaped cavity having dimensions of 0.50" wide×0.030" deep×60.00" in length. The cavity was fed via a 3.5" long cold sprue with a nominal 0.400" diameter and 3-degree taper, followed by a 1.0" long cold runner with 0.30" nominal diameter, followed by a rectangular gate 0.25" wide×0.030" thick×0.10" long. Variables controlled for the range of experimentation included resin drying, injection unit barrel temperature, mold temperature, initial injection speed, injection pressure limit, screw rotation speed and back pressure on screw recovery, injection time, and cycle time.

For each combination of variables, responses included actual melt temperature and distance of melt travel in the spiral-shaped cavity, excluding the runner and gate. The injection process was allowed to stabilize at each set of conditions—typically 10 to 15 shots—and then 10 molded specimens were collected for an average reported flow length.

All materials were molded using pressure control, with mold temperature of 120° F. (49° C.), initial injection speed of 1 in/s, injection unit pressure limit of 2000 psi, injection time of 5 s, cycle time of 32 s, maximum cushion of 0.2", screw recovery rotation speed of 150 rpm, and screw recovery back pressure of 100 psi.

Test Results

The following results in Table 4 (Ex. 1-13 and Comp. Ex. 2-4) were obtained using 4 inch×4 inch plaques which were molded from pellets of compounded materials. The injection molding conditions are provided, and the color (L*, a*, b*), % H, and % T of the resulting plaques. The $M_w$ of the cellulose ester at the pellet stage and after being molded at the plaque stage are provided along with the % $\Delta M_w$ (from pellet to plaque).

TABLE 4

Analytical Results

| | Injection Molding Conditions | | Analytical Data | | | | | | | | |
|---|---|---|---|---|---|---|---|---|---|---|---|
| EX#. | BSP ° F. | RT min | Color L* | Color a* | Color b* | ΔE | % H | % T | Plaque $M_W$ | Pellet $M_W$ | Δ $M_W$, % |
| 1-1 | 480 | 2 | 90.1 | −0.4 | 16.8 |  | 5.6 | 80 | 120,068 | 117,302 | −2 |
| 1-2 | 480 | 5 | 86.5 | 0.3 | 25.8 | 29.1 | 5.4 | 73 | 116,153 | 117,302 | 1 |
| 1-3 | 500 | 2 | 88.6 | −0.1 | 20.4 |  | 5.8 | 77 | 116,394 | 117,302 | 1 |
| 1-4 | 500 | 5 | 79.9 | 3.0 | 38.6 |  | 5.8 | 61 | 110,084 | 117,302 | 6 |
| 2-1 | 480 | 2 | 94.0 | −0.9 | 7.6 |  | 4.8 | 87 | 102,309 | 110,791 | 8 |
| 2-2 | 480 | 5 | 93.5 | −1.3 | 10.4 | 12.3 | 4.4 | 86 | 101,465 | 110,791 | 8 |
| 2-3 | 500 | 2 | 93.9 | −1.1 | 8.9 |  | 3.9 | 87 | 92,971 | 110,791 | 16 |
| 2-4 | 500 | 5 | 92.9 | −1.5 | 12.0 |  | 3.8 | 85 | 91,000 | 110,791 | 18 |
| 3-1 | 480 | 2 | 91.3 | −0.5 | 11.1 |  | 10.8 | 82 | 113,730 | 122,000 | 7 |
| 3-2 | 480 | 5 | 90.0 | −0.9 | 13.2 | 20.0 | 9.1 | 80 | 108,112 | 122,000 | 11 |
| 3-3 | 500 | 2 | 91.2 | −0.5 | 11.5 |  | 11.6 | 82 | 112,114 | 122,000 | 8 |
| 3-4 | 500 | 5 | 88.5 | −0.7 | 22.2 |  | 11.2 | 77 | 104,552 | 122,000 | 14 |
| 4-1 | 480 | 2 | 92.2 | −0.6 | 8.5 |  | 10.1 | 83 | 97,790 | 112,990 | 13 |
| 4-2 | 480 | 5 | 91.9 | −0.8 | 10.2 | 13.0 | 10.2 | 83 | 97,381 | 112,990 | 14 |
| 4-3 | 500 | 2 | 92.1 | −0.6 | 9.3 |  | 8.6 | 84 | 94,034 | 112,990 | 17 |
| 4-4 | 500 | 2 | 91.3 | −1.5 | 14.8 |  | 9.1 | 82 | 83,678 | 112,990 | 26 |
| 5-1 | 480 | 2 | 95.4 | −1.0 | 6.2 |  | 3.5 | 90 | 101,156 | 110,791 | 9 |
| 5-2 | 480 | 5 | 95.2 | −1.3 | 7.6 | 9.1 | 3.3 | 90 | 97,851 | 110,791 | 12 |
| 5-3 | 500 | 2 | 95.1 | −1.1 | 6.8 |  | 3.9 | 89 | 97,808 | 110,791 | 12 |
| 5-4 | 500 | 5 | 94.7 | −1.7 | 9.8 |  | 4.3 | 89 | 95,017 | 110,791 | 14 |
| 6-1 | 480 | 2 | 92.8 | −0.5 | 8.0 |  | 8.2 | 85 | 103,918 | 119,568 | 13 |
| 6-2 | 480 | 5 | 92.4 | −1.0 | 10.4 | 12.9 | 8.4 | 84 | 94,343 | 119,568 | 21 |
| 6-3 | 500 | 2 | 92.6 | −0.7 | 9.0 |  | 8.1 | 85 | 101,442 | 119,568 | 15 |
| 6-4 | 500 | 5 | 91.8 | −1.6 | 14.5 |  | 9.0 | 83 | 90,128 | 119,568 | 25 |
| 7-1 | 480 | 2 | 93.3 | −0.6 | 7.4 |  | 7.4 | 86 | 100,031 | 122,041 | 18 |
| 7-2 | 480 | 5 | 92.9 | −1.0 | 9.8 | 12.1 | 7.6 | 85 | 88,293 | 122,041 | 28 |
| 7-3 | 500 | 2 | 93.1 | −0.7 | 8.3 |  | 8.0 | 86 | 95,918 | 122,041 | 21 |
| 7-4 | 500 | 5 | 92.1 | −1.8 | 14.6 |  | 9.2 | 84 | 79,172 | 122,041 | 35 |
| 8-1 | 480 | 2 | 92.3 | −0.5 | 8.1 |  | 8.6 | 84 | 103,009 | 116,085 | 11 |
| 8-2 | 480 | 5 | 91.7 | −0.8 | 10.0 | 13.0 | 9.9 | 83 | 91,906 | 116,085 | 21 |
| 8-3 | 500 | 2 | 92.0 | −0.6 | 9.0 |  | 9.0 | 84 | 102,082 | 116,085 | 12 |
| 8-4 | 500 | 5 | 91.5 | −1.7 | 13.9 |  | 10.9 | 82 | 72,366 | 116,085 | 38 |
| 9-1 | 480 | 2 | 92.6 | −0.5 | 8.2 |  | 8.8 | 84 | 108,968 | 108,737 | 0 |
| 9-2 | 480 | 5 | 92.3 | −0.8 | 10.3 | 12.9 | 8.7 | 84 | 101,302 | 108,737 | 7 |
| 9-3 | 500 | 2 | 92.4 | −0.6 | 9.1 |  | 9.2 | 84 | 105,879 | 108,737 | 3 |
| 9-4 | 500 | 5 | 91.5 | −1.4 | 14.3 |  | 9.6 | 82 | 92,335 | 108,737 | 15 |
| 10-1 | 480 | 2 | 93.0 | −0.6 | 8.2 |  | 8.9 | 85 | 113,322 | 107,580 | −5 |
| 10-2 | 480 | 5 | 92.2 | −0.9 | 10.9 | 13.5 | 13.9 | 84 | 111,361 | 107,580 | −4 |
| 10-3 | 500 | 2 | 92.3 | −0.8 | 9.8 |  | 16.7 | 84 | 109,350 | 107,580 | −2 |
| 10-4 | 500 | 5 | 91.8 | −1.4 | 14.1 |  | 12.6 | 83 | 109,292 | 107,580 | −2 |
| 11-1 | 480 | 2 | 93.6 | −0.8 | 8.7 |  | 6.9 | 87 | 116,249 | 121,487 | 4 |
| 11-2 | 480 | 5 | 93.2 | −1.1 | 11.0 | 13.0 | 7.0 | 86 | 118,493 | 121,487 | 2 |
| 11-3 | 500 | 2 | 93.3 | −0.9 | 9.8 |  | 7.3 | 86 | 117,424 | 121,487 | 3 |
| 11-4 | 500 | 5 | 92.0 | −1.6 | 15.8 |  | 8.2 | 84 | 112,515 | 121,487 | 7 |

TABLE 4-continued

Analytical Results

| EX#. | Injection Molding Conditions BSP ° F. | RT min | Color L* | Color a* | Color b* | ΔE | % H | % T | Plaque M_W | Pellet M_W | Δ M_W, % |
|---|---|---|---|---|---|---|---|---|---|---|---|
| 12-1 | 480 | 2 | 95.1 | −0.9 | 6.5 | | 4.0 | 89 | 102,722 | 109,000 | 6 |
| 12-2 | 480 | 5 | 94.9 | −1.2 | 8.3 | 9.9 | 3.8 | 89 | 101,143 | 109,000 | 7 |
| 12-3 | 500 | 2 | 94.8 | −1.1 | 7.9 | | 4.0 | 89 | 97,531 | 109,000 | 11 |
| 12-4 | 500 | 5 | 94.0 | −1.9 | 12.8 | | 3.9 | 87 | 98,119 | 109,000 | 10 |
| 13-1 | 480 | 2 | 92.3 | −0.5 | 8.0 | | 9.9 | 84 | 102,109 | 110,000 | 7 |
| 13-2 | 480 | 5 | 91.9 | −1.1 | 11.1 | 13.8 | 8.5 | 83 | 98,500 | 110,000 | 10 |
| 13-3 | 500 | 2 | 92.3 | −0.7 | 8.5 | | 10.5 | 84 | 102,278 | 110,000 | 7 |
| 13-4 | 500 | 5 | 91.8 | −1.4 | 12.6 | | 10.8 | 83 | 88,676 | 110,000 | 19 |
| Comp Ex 2-1 | 480 | 2 | 89.1 | −0.2 | 18.0 | | 6.9 | 77 | 115,272 | 126,455 | 9 |
| Comp Ex 2-2 | 480 | 5 | 85.6 | 0.6 | 26.8 | 30.5 | 6.6 | 72 | 112,983 | 126,455 | 11 |
| Comp Ex 2-3 | 500 | 2 | 87.2 | 0.2 | 22.5 | | 7.2 | 75 | 113,373 | 126,455 | 10 |
| Comp Ex 2-4 | 500 | 5 | 77.4 | 4.3 | 42.2 | | 7.3 | 58 | 101,823 | 126,455 | 19 |

Table 5 provides the notched izod, heat distortion temperature and flexural modulus for Comp. Ex. 1, 3, and 4, and Ex. 2, 3, 12, and 13.

TABLE 5

Notched Izod, HDT and Flex. Modulus

| Ex. No. | Notched Izod 23° C. (J/m) | HDT @ 1.8 MPa (° C.) | Flex. Modulus (MPa) |
|---|---|---|---|
| Comp. Ex. 1 | 217 | 84 | 1845 |
| Comp. Ex. 3 | 400 | 75 | 1400 |
| Comp. Ex. 4 | 187 | 73 | 1400 |
| 2 | 80 | 103 | 2065 |
| 3 | 199 | 99 | 2010 |
| 12 | 80 | 103 | 2100 |
| 13 | 200 | 99 | 2000 |

Table 6 provides spiral flow data for Ex. 12-13 and Comp. Ex. 3.

TABLE 6

Spiral Flow

| Ex. # | Barrel Temp. (° C.) | Melt Temp. (° C.) | Spiral flow @6.9 MPa, 3.2 mm mold thickness (cm) |
|---|---|---|---|
| 12 | 227 | 246 | — |
| 13 | 227 | 242 | 17.2 |
| 13 | 238 | 249 | 22 |
| 13 | 249 | 257 | 27.2 |

TABLE 6-continued

Spiral Flow

| Ex. # | Barrel Temp. (° C.) | Melt Temp. (° C.) | |
|---|---|---|---|
| Comp. Ex. 3 | 238 | 249 | 32 |
| | | | Spiral flow @ 13.8 MPa, 0.8 mm mold thickness (cm) |
| 12 | 227 | 235 | 5 |
| 12 | 238 | 246 | 5.8 |
| 12 | 249 | 257 | 6.2 |
| 13 | 227 | 235 | 5.5 |
| 13 | 238 | 246 | 6.2 |
| 13 | 249 | 257 | 7.0 |
| Comp. Ex. 3 | 227 | 235 | 9.2 |
| Comp. Ex. 3 | 238 | 246 | 10.0 |
| Comp. Ex. 3 | 249 | 257 | 12.5 |

ESCR—Property Retention in Reverse Side Impact

Testing was conducted using injection molded flex bars with length, width, and thickness of 5.0", 0.5", and 0.125", respectively. Bars were conditioned at 23 C/50% RH for a minimum of 72 hr. Bars were clamped into a constant strain fixture or a 3-point bend fixture at 1.5% strain, and exposed to chemical reagents using a wet patch method for low viscosity or volatile materials, and direct wiping for high viscosity materials. After the reagents were applied to the bars on the side without ejector pin marks, the strain fixtures with bars attached were sealed in polyethylene bags for 24 hours at nominal temperature of 23 C, after which the bars were wiped clean and removed from the strain fixture.

Bars were tested at 23 C for reverse-side impact within 24-96 hours after removal from the strain fixture. The test apparatus was a CEAST Pendulum Impact Tester equipped with a 15-Joule hammer. Bars were positioned in a 2-inch span fixture, with the non-chemically exposed side facing the hammer. Four control bars (no strain, no chemical exposure) were impact tested in addition to four bars that were chemically exposed. The comparison of results between the controls and the chemically exposed bars was used to calculate percent retention of original impact energy.

TABLE 7

Property Retention in Reverse Side Impact

| | Fixture | | | | | |
|---|---|---|---|---|---|---|
| | 3-Point Bend | | | Constant Strain | | |
| | % Retained Property - Reverse Side Impact | | | | | |
| | Polymer Type | | | | | |
| Material | CAP Comp. Ex. 3 | CAP Ex. 12 | CAP Ex. 13 | PC Covestro Makrolon 2458 | PMMA Evonik CYRO Acrylite H12 | SMMA Ineos Styrolution NAS 90 |
| Lipids | 97 | 91 | 90 | 54 | 61 | 88 |
| IPA 98% | 80 | 100 | 91 | 23 | 0 | 61 |
| Virex TB | 92 | 100 | 96 | 0 | | |
| CaviCide | 91 | 100 | 96 | 53 | | |
| Sani-Cloth HB | 89 | 93 | 87 | 65 | | |
| Sani-Cloth AFIII | 89 | 96 | 89 | 4 | | |
| Clorox Bleach | 100 | 100 | 100 | | 42 | 115 |
| Hydrogen peroxide | 94 | 98 | 94 | 104 | | |
| Canola Oil | 100 | 78 | 99 | 0 | 0 | 55 |
| Windex Glass Cleaner | 100 | 100 | 100 | | 27 | 112 |
| 409 Multi-Surface Cleaner | 91 | 94 | 92 | 27 | 39 | 125 |
| SPF 30 Lotion | 100 | 96 | 91 | 6 | 0 | 80 |

ESCR—Property Retention in Tensile Test

Testing was conducted using injection molded tensile bars with length, center width, and thickness of 8.5", 0.5", and 0.125", respectively. Bars were conditioned at 23° C./50% RH for a minimum of 72 hr. Bars were clamped into a constant strain fixture at 1.0% strain, and exposed to chemical reagants using a wet patch method for low viscosity or volatile materials, and direct wiping for high viscosity materials. After the reagents were applied to the bars on the side without ejector pin marks, the strain fixtures with bars attached were sealed in polyethylene bags for 24 hours at nominal temperature of 23° C., after which the bars were wiped clean and removed from the strain fixture.

Bars were tested at 23° C. for tensile properties within 24-96 hours after removal from the strain fixture. The test apparatus was an Instron Tensile Tester equipped with a 10 kN load cell. Bars were positioned in the grips with a 4.5" span between the grips and pulled at 0.2 in/min for the first 0.03 inches, and at 2.0 in/min for the remainder of the pull to break. Five control bars (no strain, no chemical exposure) were tensile tested in addition to five bars that were chemically exposed. The comparison of results between the controls and the chemically exposed bars was used to calculate percent retention of original break strength and break elongation.

TABLE 8

Property Retention in Tensile Test

| | % Retained Property - Tensile Stress to Break & Elongation to Break (Combined Score) | | | |
|---|---|---|---|---|
| Fixture: Constant Strain Material | Comp. Ex. 3 | Ex. 12 | Ex. 13 | Covestro Bayblend T85 |
| Polymer Type | CAP | CAP | CAP | PC/ABS |
| Formula 409 Multi-Surface Cleaner | 90-100 | 90-100 | 90-100 | 30-40 |
| Isopropyl alcohol, 70% | 40-50 | 80-90 | 80-90 | 70-80 |

Flex Creep Deflection

Injection molded flex bars with dimensions of 5" length, 0.5" width, and 0.125" thickness were positioned horizontally on a fixture with a 4" span, inside an oven in accordance with test set up of ASTM D2990. Weights were suspended from each bar in the center of the span, with the mass selected to give a nominal 500 psi stress on the flex bar.

The bars, with weights suspended, were left exposed in the oven for the specified duration of time. After the exposure was complete, the weights were removed from the bars, the bars were cooled in ambient air to room temperature and measured for deflection of the 4-inch free span.

TABLE 9

Flex Creep Deflection

| Condition Reference | | A | B |
|---|---|---|---|
| Exposure Conditions | | Oven | Oven |
| Exposure Time, hr | | 148 | 68 |
| Temperature, C | | 60 | 90 |
| Stress, psi | | 500 | 500 |
| Material | Polymer Type | Deflection, mm | |
| Ex. 12 | CAP | 2.2 | 7.0 |
| Ex. 13 | CAP | 2.5 | 9.3 |
| Comp. Ex. 3 | CAP | 13.4 | 19.6 |
| DuPont Zytel 101 | Nylon 66 | 2.3 | 1.6 |
| Covestro Makrolon 2458 | PC | 0.9 | 0.8 |
| Covestro Bayblend T65 | PC/ABS | 1.0 | 2.9 |
| EMS-Grivory Grilamid TR90 | Nylon | 2.4 | 5.1 |
| BASF Luran 358N | SAN | 2.0 | 12.9 |
| Eastman Tritan TX1000 | Copolyester | 2.4 | 22.8 |
| Evonik CYRO Acrylite H12 | PMMA | 4.4 | 16.5 |

Dimensional Change in Moisture Test

Injection molded flex bars with dimensions of 5" length, 0.5" width, and 0.125" thickness were immersed in deionized water at 85 C for 310 hours to achieve maximum moisture absorption. Prior to immersion, the bars were conditioned for 48 hours minimum at 23 C/50% RH.

Weight and dimensions of the bars were measured before and after water immersion to calculate percent change in length. An average of 3 test bars for each test was recorded.

TABLE 10

Dimensional Change in Moisture

| Material | Polymer Type | Weight Gain, % | Change in Length, % |
|---|---|---|---|
| Eastman Tenite 380-18 | CAP, with PZ | −0.2 | 7.8 |
| Ex. 12 | CAP, no PZ | 4.0 | 0.9 |
| Ex. 13 | CAP, no PZ | 3 | 0.8 |
| DuPont Zytel 101L | Crystalline nylon | 8.0 | 1.8 |
| DuPont Zytel 330 | Amorphous nylon | 4.0 | 1.0 |
| EMS-Grivory Grilamid TR90 | Amorphous nylon | 3.2 | 0.6 |
| Eastman Tritan TX1001 | Copolyester | 0.7 | 0.09 |
| Covestro Makrolon 2458 | PC | 0.6 | 0.05 |
| Covestro Bayblend T65 | PC/ABS | 0.8 | 0.08 |
| Evonik CYRO Acrylite H12 | PMMA | 2.2 | −4.3 |

Examples 14-39 in Tables 11-15 were prepared as follows. The cellulosic powder was first premixed in a drum tumbler with either KaneAce B564 MBS impact modifier from Kaneka Corporation or KaneAce EC0100 acrylic impact modifier from Kaneka Corporation along with 1% epoxidized octyl tallate stabilizer.

The premixed material was then compounded on a Werner & Pflerderer 30 mm twin screw extruder at a throughput of 35 lbs/hour with screw speed of 250 rpm and barrel temperature of 220° C. for the CAP 482 based compositions and a barrel temperature of 240° C. for the CA and CAP 141-20 based compositions.

The compounded material was then injection molded into 3.2 mm thick by 12.8 mm wide bars on a Toyo 110 Ton injection molding machine with barrel temperature of 240° C. and mold temperature of 70° C.

The cellulose ester material used in the examples was selected from Eastman products CAP 482-20, CAP482-0.5, and CAP 141-20. Heat Deflection Temperature (HDT) was determined on the molded bars according to ASTM Method D648, as discussed above, except samples (for Examples 14-39) were conditioned by placing in a 70° C. oven for 5 hours prior to HDT testing.

The compositions and properties of the materials for Examples 14-39 are shown in Tables 11-15.

TABLE 11

Opaque impact modified CAP materials

| Experiment/Composition | ASTM Method | Ex 14 | Ex 15 | Ex 16 | Ex 17 | Ex 18 | Ex 19 | Ex 20 | Ex 21 | Ex 22 | Ex 23 |
|---|---|---|---|---|---|---|---|---|---|---|---|
| CAP 482-20 (wt %) | | 99 | 97 | 95 | 93 | 90 | 87 | 84 | 81 | 78 | 69 |
| Kane Ace 564 (wt %) | | 0 | 2 | 4 | 6 | 9 | 12 | 15 | 18 | 21 | 30 |
| Epoxide octyl tallate (wt %) | | 1 | 1 | 1 | 1 | 1 | 1 | 1 | 1 | 1 | 1 |
| Heat distortion temperature @0.455 Mpa (° C.) | D648 | 119.7 | 116.4 | 113.3 | 118.3 | 117.4 | 116.6 | 113.9 | 113.7 | 112.5 | 107.4 |
| Heat distortion temperature @1.82 Mpa (° C.) | | 105 | | | 100 | 100.3 | 100 | 95.5 | 96.3 | 95 | 90.2 |
| Izod Impact Strength @23 C. (J/m) | D256 | 79.8 | 181.4 | 183.5 | 201.6 | 201.2 | 201.6 | 202.7 | 181.4 | 166.6 | 180 |
| Izod Impact Strength @−40 C. (J/m) | | 58.9 | 121.1 | 117.3 | 105.45 | 88.11 | 80.15 | 101.04 | 115.5 | 95.32 | |

TABLE 12

Clear, UV resistant impact modified CAP materials

| Experiment/Composition | ASTM Method | Ex 24 | Ex 25 | Ex 26 | Ex 27 | Ex 28 | Ex 29 | Ex 30 | Ex 31 |
|---|---|---|---|---|---|---|---|---|---|
| CAP 482-20 (wt %) | | 97 | 95 | 93 | 90 | 87 | 84 | 81 | 78 |
| Kane Ace ECO100 (wt %) | | 2 | 4 | 6 | 9 | 12 | 15 | 18 | 21 |
| Epoxidized octyl tallate (wt %) | | 1 | 1 | 1 | 1 | 1 | 1 | 1 | 1 |
| Heat distortion temperature @0.455 Mpa (° C.) | D648 | 114.6 | 113.5 | 114.1 | 110.9 | 113 | 110.8 | 107.4 | 109.5 |
| Heat distortion temperature @1.82 Mpa (° C.) | | | | 98.9 | 97.5 | 99.2 | 96.9 | 95 | 93.9 |
| Izod Impact Strength @23 C. (J/m) | D256 | 161.8 | 192.4 | 198.9 | 216.6 | 215.7 | 230.2 | 199.1 | 180.4 |
| Izod Impact Strength @−40 C. (J/m) | | 105.8 | 122.1 | 75.4 | 71.5 | 74.6 | 96.9 | 80 | 88.6 |

TABLE 13

High flow impact modified CAP materials

| Experiment/Composition | ASTM Method | Ex 32 | Ex 33 | Ex 34 | Ex 35 | Ex 36 |
|---|---|---|---|---|---|---|
| CAP 482-20 (wt %) | | 47.5 | 46.5 | 45 | 43.5 | 42 |
| CAP 482-0.5 (wt %) | | 47.5 | 46.5 | 45 | 43.5 | 42 |
| Kane Ace 564 (wt %) | | 4 | 6 | 9 | 12 | 15 |
| Epoxidized octyl tallate (wt %) | | 1 | 1 | 1 | 1 | 1 |
| Heat distortion temperature @0.455 Mpa (° C.) | D648 | 103.8 | 100.9 | 97.9 | 114.5 | 113 |
| Heat distortion temperature @1.82 Mpa (° C.) | | | | | | 96.2 |
| Izod Impact Strength @23 C. (J/m) | D256 | 163.8 | 161 | 145.4 | 141.6 | 179.7 |
| Izod Impact Strength @-40 C. (J/m) | | 97 | 100.8 | 122.5 | 122.6 | 85.5 |

TABLE 14

High temperature impact modified CAP material

| Experiment/Composition | ASTM Method | Ex 37 | Ex 38 |
|---|---|---|---|
| CAP141-20 (wt %) | | 99 | 84 |
| Kane Ace ECO100 (wt %) | | 0 | 15 |
| Epoxidized octyl tallate (wt %) | | 1 | 1 |
| Heat distortion temperature @0.455 Mpa, (° C.) | D648 | 148.6 | 147.7 |
| Heat distortion temperature @1.82 Mpa, (° C.) | | 128.4 | 126.8 |
| Izod Impact Strength @23 C (J/m) | D256 | 45.5 | 85.0 |
| Izod Impact Strength @-40 C (J/m) | | 35.7 | 45.8 |

TABLE 15

CAP blended with a modified olefin impact modifier

| Experiment/Composition | ASTM Method | Ex 39 |
|---|---|---|
| CAP 482-20 (wt %) | | 84 |
| Lotader AX8900 (wt %) | | 15 |
| Epoxidized octyl tallate (wt %) | | 1 |
| Heat distortion temperature @0.455 Mpa, (° C.) | D648 | 97.2 |
| Heat distortion temperature @1.82 Mpa, (° C.) | | 115.1 |
| Izod Impact Strength @23 C, (J/m) | D256 | 117 |
| Izod Impact Strength @-40 C, (J/m) | | |

A review of Tables 11-15, show that examples 15-36 and 38-39 have higher toughness than examples 14 and 37, that do not contain impact modifier.

Melt Processability of Example 26

The flow behavior of Example 26 from Table 12 above was compared to typical plastic material using a spiral flow test. The spiral flow test was conducted filing a 0.5" wide× 0.125" thick spiral flow mold with molten material using a Toyo 110 ton machine with an injection pressure of 1000 psi, injection speed of 1.0" per second, fill time of 10 second, screw speed of 150 rpm, back pressure of 100 psi, cooling time of 22 seconds. The flow length is the length of the spiral of each material molded at a specific barrel temperature under the same molding conditions.

Spiral Flow was first run to determine the flow length values of certain polymeric materials. The materials used were Makrolon 2458 polycarbonate (PC) from Covestro, Lustran SAN 31 (styrene-acrylonitrile or SAN) from INEOS, and Terluran GP22NR ABS from INEOS. These materials were run at processing temperatures, as shown in table 16 below.

In addition to the materials discussed above, spiral flow was determined for example 26 and comparative example 3. These materials were run at processing temperatures, as shown in table 16.

TABLE 16

Spiral Flow Length

| Material | Barrel Set Point ° F./° C. | Spiral Flow Avg. Fill (inches) |
|---|---|---|
| ABS | 460/238 | 21.75 |
| ABS | 480/249 | 25 |
| ABS | 500/260 | 28.75 |
| SAN | 420/216 | 15 |
| SAN | 440/227 | 18.75 |
| SAN | 460/238 | 22.25 |
| SAN | 480/249 | 25.75 |
| PC | 500/260 | 7 |
| PC | 520/271 | 10.5 |
| PC | 540/282 | 13.75 |
| PC | 560/293 | 17 |
| Ex 26 | 480/249 | 27.25 |
| Ex 26 | 460/238 | 22 |
| Ex 26 | 440/227 | 17.25 |
| Comp. Ex 3 | 400/204 | 25 |
| Comp. Ex 3 | 420/216 | 32 |
| Comp. Ex 3 | 440/227 | 38 |

A review of table 16 reveals that the flow length values of the commercial materials is between 10 and 30 inches. The spiral flow of example 26 shows that the composition has very good flow (similar to ABS and SAN and better than PC) indicating that the examples of the invention can be melt processed in injection molding and other processes. The spiral flow length of comparative example 3 (fully plasticized CAP with no impact modifier) was the highest.

In examples 40-44, cellulose ester compositions were prepared by compounding CAP 482-20 with additional impact modifiers, including several block copolymer thermoplastic elastomers, and an ABS core-shell impact modifier. The compounding of the cellulose ester compositions was conducted on a Leistritz 18 mm (50:1 L/D ratio) twin screw extruder at a throughput of 18 lbs/hour with screw speed of 250 rpm and barrel temperature of 220° C. The barrel temperatures were 230° C. for compounding CA and CAP141-20 based compositions. The compounded material was then injection molded into 3.2 mm thick by 12.8 mm wide bars on a Toyo 110 Ton injection molding machine with barrel temperature of 240 C and mold temperature of 70 C. Properties for these compositions are compared to example 14 in Table 17.

Glass transition temperature (Tg) was measured according to ASTM Standard Method D3418, where the sample is heated from -100° C. at a heating rate of 20° C./min. DSC scans of blends of materials may show multiple Tg transitions. If more than one Tg transition was determined during the scan, the matrix glass transition is defined as the highest Tg measured during the scan.

Notched Izod Impact Strength was performed on 3.2 mm thick molded bars at 230 C after notching according to ASTM Method D256, after conditioning the bars at 230 C and 50% RH for 48 hours.

TABLE 17

CAP blended with selected block copolymer impact modifiers or an ABS core shell impact modifier

| Experiment/Composition | Ex 14 | Ex 40 | Ex 41 | Ex 42 | Ex 43 | EX44 |
|---|---|---|---|---|---|---|
| CAP141-20 (wt %) | 100 | 90 | 90 | 90 | 90 | 70 |
| Blendex 338 ABS core shell impact modifier (wt %) | | 10 | | | | 30 |
| Kraton FG1924 G SEBS block copolymer (wt %) | | | 10 | | | |
| Estane ALR 72A TPU block copolymer (wt %) | | | | 10 | | |
| Hytrel 3078 polyester-ether block copolymer (wt %) | | | | | 10 | |
| Glass Transition Temperature (Tg) | 147 | 142 | 142 | 142 | 141 | 139 |
| Izod Impact Strength @23° C. (J/m) | 79.8 | 210 | 379 | 316 | 219 | 226 |

Other embodiments will be apparent to those skilled in the art from consideration of the specification and practice of the embodiments disclosed herein. It will be understood that variations and modifications can be effected within the spirit and scope of the disclosed embodiments. It is further intended that the specification and examples be considered as exemplary only, with a true scope and spirit of the disclosed embodiments being indicated by the following claims.

That which is claimed is:

1. An injection molded article comprising a thin-walled body portion formed from a polymer-based resin derived from cellulose,
    wherein the thin-walled body portion comprises:
    i. a gate position;
    ii. a last fill position;
    iii. a flow length to wall thickness ratio greater than or equal to 100, wherein the flow length is measured from the gate position to the last fill position; and
    iv. a wall thickness less than or equal to about 2 mm; and
    wherein the polymer-based resin is a cellulose ester composition that comprises an impact modifier in an amount from 1 to 30 wt % and a plasticizer in an amount from 0 to 10 wt %, based on the weight of the cellulose ester composition, and
    wherein the polymer-based resin has an HDT or at least 95° C., a bio-derived content of at least 20 wt %, and a spiral flow length of at least 3.0 cm, when the polymer-based resin is molded with a spiral flow mold with the conditions of a barrel temperature of 238° C., a melt temperature of 246° C., a molding pressure of 13.8 MPa, a mold thickness of 0.8 mm, and a mold width of 12.7 mm.

2. The injection molded article according to claim 1, wherein the flow length to wall thickness ratio is in the range from 250 to 1500.

3. The injection molded article according to claim 2, wherein the flow length to wall thickness ratio is in the range from 500 to 1500.

4. The injection molded article according to claim 1, wherein the wall thickness is in the range from 0.1 to 1.5 mm.

5. The injection molded article according to claim 4, wherein the wall thickness is in the range from 0.1 to 1.0 mm.

6. The injection molded article according to claim 5, wherein the wall thickness is in the range from 0.1 to 0.5 mm.

7. The injection molded article according to claim 1, wherein the polymer-based resin has an HDT in the range from 100° C. to 140° C.

8. The injection molded article according to claim 1, wherein the polymer-based resin has a bio-derived content in the range from 40 wt % to 60 wt %.

9. The injection molded article according to claim 1, wherein the polymer-based resin has a spiral flow length of at least 5.0 cm.

10. The injection molded article according to claim 1, wherein the polymer-based resin further comprises at least one property chosen from: flexural modulus of greater than 1900 MPa as measured according to ASTM D790 using a 3.2 mm thick bar hat has been subjected to 50% relative humidity for 48 hours at 23° C.; a notched izod impact strength of greater than 80 J/m as measured according to ASTM D256 using a 3.2 mm thick bar hat has been subjected to 50% relative humidity for 48 hours at 23° C.; a flex creep deflection of less than 12 mm, measured using a molded bar having dimensions of 5" length, 0.5" width, and 0.125" thickness positioned horizontally on a fixture with a 4" span, inside a dry oven for 68 hours at 90° C. with a nominal 500 psi stress on the center of the span; a transmission of at least 70 measured according to ASTM D1003 using a 3.2 mm plaque after injection molding at a barrel set point of 249° C. and a residence time of 5 min; a ΔE value of less than 25, using a 3.2 mm plaque after injection molding with a barrel temperature of 249° C. and a residence time of 5 min; or an L* color of at least 85, measured according to ASTM E1348 using a 3.2 mm plaque after injection molding with a barrel temperature of 249° C. and a residence time of 5 min.

11. The injection molded article according to any of claim 10, wherein the polymer-based resin comprises at least 2 of the listed properties.

12. The injection molded article according to claim 1, wherein the polymer-based resin contains no plasticizer.

13. The injection molded article according to claim 1, wherein the gate position comprises a gate having a gate size, wherein ratio of gate size to wall thickness 0.5:1 or less.

14. The injection molded article according to claim 13, wherein the gate size is in the range from 0.1 to 0.5 mm.

15. The injection molded article according to claim 14, wherein the wall thickness is in the range from 0.2 to 1.0 mm or less.

16. The injection molded article according to claim 1, wherein the polymer-based resin comprises a cellulose ester chosen from cellulose acetate propionate (CAP), cellulose acetate (CA), or combinations thereof.

17. The injection molded article according to claim 16, wherein the cellulose ester is CAP and the polymer-based resin comprises 0-1 wt % plasticizer.

18. The injection molded article according to claim 17, wherein the polymer-based resin comprises CAP and contains no plasticizer.

19. The injection molded article according to claim 16, wherein the cellulose ester is CA and the polymer-based resin comprises 1-10 wt % plasticizer.

20. The injection molded article according to claim 19, wherein the polymer-based resin comprises CA and contains plasticizer in an amount from 1 to less than 10 wt %.

* * * * *